US009124874B2

(12) United States Patent
Chen et al.

(10) Patent No.: US 9,124,874 B2
(45) Date of Patent: Sep. 1, 2015

(54) ENCODING OF THREE-DIMENSIONAL CONVERSION INFORMATION WITH TWO-DIMENSIONAL VIDEO SEQUENCE

(75) Inventors: Ying Chen, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 601 days.

(21) Appl. No.: 12/643,632

(22) Filed: Dec. 21, 2009

(65) Prior Publication Data

US 2010/0309286 A1    Dec. 9, 2010

Related U.S. Application Data

(60) Provisional application No. 61/184,649, filed on Jun. 5, 2009.

(51) Int. Cl.
| | |
|---|---|
| *H04N 15/00* | (2006.01) |
| *H04N 13/00* | (2006.01) |
| *H04N 13/02* | (2006.01) |
| *H04N 19/597* | (2014.01) |
| *H04N 19/70* | (2014.01) |

(Continued)

(52) U.S. Cl.
CPC ....... *H04N 13/0207* (2013.01); *H04N 13/0011* (2013.01); *H04N 13/0048* (2013.01); *H04N 13/0059* (2013.01); *H04N 13/0062* (2013.01); *H04N 13/0066* (2013.01); *H04N 13/026* (2013.01); *H04N 13/0292* (2013.01); *H04N 19/46* (2014.11); *H04N 19/597* (2014.11); *H04N 19/61* (2014.11); *H04N 19/70* (2014.11)

(58) Field of Classification Search
CPC .......... H04N 13/0011; H04N 13/0059; H04N 13/0066; H04N 13/0062; H04N 13/0048; H04N 13/0207; H04N 13/026; H04N 13/0292
USPC .......................................... 348/43, 42, 46, 51
See application file for complete search history.

(56) References Cited

U.S. PATENT DOCUMENTS 5,625,408 A    4/1997  Matsugu et al.
5,768,404 A    6/1998  Morimura et al.
(Continued)

FOREIGN PATENT DOCUMENTS

CN        1917658 A       2/2007
DE     102007021518       11/2008
(Continued)

OTHER PUBLICATIONS

A. Bourge, et al., "MPEG-C Part 3: Enabling the Introduction of Video Plus Depth Contents," Philips Research and the Eindhoven University of Technology, Eindhoven, The Netherlands, Jun. 2006.
(Continued)

*Primary Examiner* — Geepy Pe
(74) *Attorney, Agent, or Firm* — Brent A. Boyd

(57) ABSTRACT

Techniques for encoding a two-dimensional (2D) video sequence of video frames along with three-dimensional (3D) conversion information comprising a set of parameters that can be applied to each of the video frames of the 2D sequence to generate 3D video data are described. The set of parameters can be applied to each of the original video frames of the 2D sequence to generate secondary views of each of the original video frames. The original video frames and the secondary views may collectively define a stereoscopic 3D video sequence.

46 Claims, 7 Drawing Sheets

(51) Int. Cl.
*H04N 19/46* (2014.01)
*H04N 19/61* (2014.01)

(56) References Cited

U.S. PATENT DOCUMENTS

| | | | |
|---|---|---|---|
| 5,929,859 | A | 7/1999 | Meijers |
| 6,163,337 | A | 12/2000 | Azuma et al. |
| 6,208,348 | B1 | 3/2001 | Kaye |
| 7,515,759 | B2 * | 4/2009 | Sun ........................ 382/234 |
| 7,551,770 | B2 | 6/2009 | Harman |
| 2003/0202594 | A1 | 10/2003 | Lainema |
| 2005/0057561 | A1 | 3/2005 | El-Din ElShishiny et al. |
| 2005/0084006 | A1 | 4/2005 | Lei et al. |
| 2005/0243934 | A1 | 11/2005 | Werner et al. |
| 2007/0024614 | A1 | 2/2007 | Tam et al. |
| 2008/0150945 | A1 | 6/2008 | Wang et al. |
| 2008/0225045 | A1 | 9/2008 | Birtwistle et al. |
| 2008/0303894 | A1 | 12/2008 | Ernst et al. |
| 2009/0041339 | A1 | 2/2009 | Yamada et al. |
| 2010/0067873 | A1 * | 3/2010 | Sasaki et al. ........................ 386/95 |
| 2011/0115886 | A1 | 5/2011 | Nguyen et al. |
| 2011/0148858 | A1 | 6/2011 | Ni et al. |

FOREIGN PATENT DOCUMENTS

| | | | |
|---|---|---|---|
| EP | 1437898 | A1 | 7/2004 |
| JP | H0715748 | A | 1/1995 |
| JP | H07282259 | A | 10/1995 |
| JP | H08149510 | A | 6/1996 |
| JP | H1032840 | A | 2/1998 |
| JP | 2001061164 | A | 3/2001 |
| JP | 2001256482 | A | 9/2001 |
| JP | 2004200973 | A | 7/2004 |
| JP | 2004343290 | A | 12/2004 |
| JP | 2005130313 | A | 5/2005 |
| JP | 2009044722 | A | 2/2009 |
| WO | 2008127676 | A2 | 10/2008 |
| WO | WO-2010144074 | A1 | 12/2010 |

OTHER PUBLICATIONS

"Text of ISO/IEC FDIS 23002-3 Representation of Auxiliary Video and Supplemental Information," ISO/IEC JTC 1/SC29/WG11, MPEG Doc. N8768, Marrakech, Morocco, Jan. 2007.

"Joint Draft 8.0 on Multiview Video Coding", 28th JVT meeting, Hannover, Germany, Jul. 2008, available from http://wftp3.itu.int/av-arch/jvt-site/2008_07_Hannover/JVT-AB204.zip.

Guofeng Zhang et al., "Stereoscopic Video Synthesis from a Monocular Video," IEEE Service Center, 2007, vol. 13 (4), 686-696.

International Search Report and Written Opinion—PCT/US2010/037554, International Search Authority—European Patent Office—Sep. 20, 2010.

Kimata H., et al., "Real-time MVC viewer for free viewpoint navigation," IEEE, 2008, 1437-1440.

Knorr S., et al., "Stereoscopic 3D from 2D video with super-resolution capability," Image Communication, 2008, vol. 23, Elsevier Science Publishers, 665-676.

Co-pending U.S. Appl. No. 13/301,319, filed Nov. 21, 2011.

Tsung et al., "Single iteration view interpolation for multiview video applications", 3DTV Conference: The True Vision—Capture, Transmission and Display of 3D Video, 2009, May 4, 2009, pp. 1-4, IEEE, XP031471529, ISBN: 978-1-4244-4317-8, DOI: 10.1109/3DTV.2009.5069621.

Taiwan Search Report—TW099118494—TIPO—Mar. 24, 2013.

* cited by examiner

ENCODING OF THREE-DIMENSIONAL CONVERSION INFORMATION WITH TWO-DIMENSIONAL VIDEO SEQUENCE

This application claims the benefit of U.S. Provisional Application No. 61/184,649, filed on Jun. 5, 2009, the entire content of which is incorporated herein by reference.

TECHNICAL FIELD

The disclosure relates to video coding, and conversion of two-dimensional (2D) video data to three-dimensional (3D) video data.

BACKGROUND

Digital multimedia capabilities can be incorporated into a wide range of devices, including digital televisions, digital direct broadcast systems, wireless communication devices, wireless broadcast systems, personal digital assistants (PDAs), laptop or desktop computers, digital cameras, digital recording devices, video gaming devices, video game consoles, cellular or satellite radio telephones, digital media players, and the like. Digital multimedia devices may implement video coding techniques, such as MPEG-2, ITU-H.263, MPEG-4, or ITU-H.264/MPEG-4 Part 10, Advanced Video Coding (AVC), to transmit and receive or store and retrieve digital video data more efficiently. Video encoding techniques may perform video compression via spatial and temporal prediction to reduce or remove redundancy inherent in video sequences.

Most conventional video sequences are provided in two-dimensional (2D) viewing format. However, three-dimensional (3D) sequences are also possible, in which case the video sequence has two or more views associated with each video frame. In this case, the two or more views may be combined on a 3D display to render 3D video. Communication of 3D video sequences can require significant amounts of additional data relative to 2D video sequences. For example, to communicate a 3D video sequence, two separate video frames may be needed to provide the two different views of each 2D video frame, thus approximately doubling the amount of data being communicated.

SUMMARY

This disclosure describes techniques for encoding a two-dimensional (2D) video sequence of video frames along with three-dimensional (3D) conversion information comprising a set of parameters that can be applied to each of the video frames of the 2D sequence to generate 3D video data. This disclosure also describes the communication and decoding of the 2D video sequence and the 3D conversion information. The set of parameters may comprise a relatively small amount of data that can be applied to each of the original video frames of the 2D sequence to generate secondary view video frames of each of the original video frames. The original video frames and the secondary view video frames may collectively define a stereoscopic 3D video sequence. The 2D sequence and the set of parameters may comprise significantly less data than would otherwise be needed to communicate a 3D sequence. The 2D sequence and the set of parameters may comprise negligible increase to the data required to communicate the original 2D sequence. This disclosure also describes some exemplary syntax that may be used to encode the set of parameters in an effective and efficient manner.

A receive device may decode and render the 2D sequence even if the receive device does not support 3D decoding or 3D rendering. On the other hand, if the receive device supports 3D decoding and 3D rendering consistent with this disclosure, the receive device may generate and render the 3D sequence based on the 2D sequence and the set of parameters. In this way, the techniques of this disclosure may support backward compatible 2D to 3D video coding and conversion in which the same bitstream can be used to render 2D video output or 3D video output. Moreover, as mentioned, the described techniques may reduce the amount of data needed for the communication of a 3D video sequence.

In one example, this disclosure describes a method comprising encoding a 2D sequence of video frames in a video encoder, encoding 3D conversion information via the video encoder, wherein the 3D conversion information comprises a set of parameters that can be applied to each of the video frames of the 2D sequence to generate 3D video data, and communicating the encoded 2D sequence with the 3D conversion information.

In another example, this disclosure describes a method comprising receiving a 2D sequence of video frames at a video decoder, receiving 3D conversion information with the 2D sequence at the video decoder, wherein the 3D conversion information comprises a set of parameters that can be applied to each of the video frames of the 2D sequence to generate 3D video data, decoding the 2D sequence via the video decoder, and generating the 3D video data via the video decoder based on the 2D sequence and the 3D conversion information.

In another example, this disclosure describes an apparatus comprising a video encoder that encodes a 2D sequence of video frames, and encodes 3D conversion information with the 2D sequence, wherein the 3D conversion information comprises a set of parameters that can be applied to each of the video frames of the 2D sequence to generate 3D video data.

In another example, this disclosure describes an apparatus comprising a video decoder that receives a 2D sequence of video frames, receives 3D conversion information with the 2D sequence, wherein the 3D conversion information comprises a set of parameters that can be applied to each of the video frames of the 2D sequence to generate 3D video data, decodes the 2D sequence, and generates the 3D video data based on the 2D sequence and the 3D conversion information.

In another example, this disclosure describes a device comprising means for encoding a 2D sequence of video frames in a video encoder, means for encoding 3D conversion information via the video encoder, wherein the 3D conversion information comprises a set of parameters that can be applied to each of the video frames of the 2D sequence to generate 3D video data, and means for communicating the encoded 2D sequence with the encoded parameters.

In another example, this disclosure describes a device comprising means for receiving a 2D sequence of video frames at a video decoder, means for receiving 3D conversion information with the 2D sequence at the video encoder, wherein the 3D conversion information comprises a set of parameters that can be applied to each of the video frames of the 2D sequence to generate 3D video data, means for decoding the 2D sequence, and means for generating the 3D video data based on the 2D sequence and the 3D conversion information.

In another example, this disclosure describes methods, apparatuses or devices that apply 3D conversion information to a 2D sequence to generate 3D video data, wherein the 3D conversion information comprises a set of parameters that can be applied to each video frame of the 2D sequence to generate the 3D video data.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium and loaded and executed in the processor.

Accordingly, this disclosure also contemplates computer-readable storage medium comprising instructions that upon execution by a processor cause the processor to encode a 2D sequence of video frames, and encode 3D conversion information, wherein the 3D conversion information comprises a set of parameters that can be applied to each of the video frames of the 2D sequence to generate 3D video data.

In addition, this disclosure describes a computer-readable storage medium comprising instructions that upon execution by a processor cause the processor to upon receiving a 2D sequence of video frames and receiving 3D conversion information with the 2D sequence, wherein the 3D conversion information comprises a set of parameters that can be applied to each of the video frames of the 2D sequence to generate 3D video data, decode the 2D sequence, and generate the 3D video data based on the 2D sequence and the 3D conversion information.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
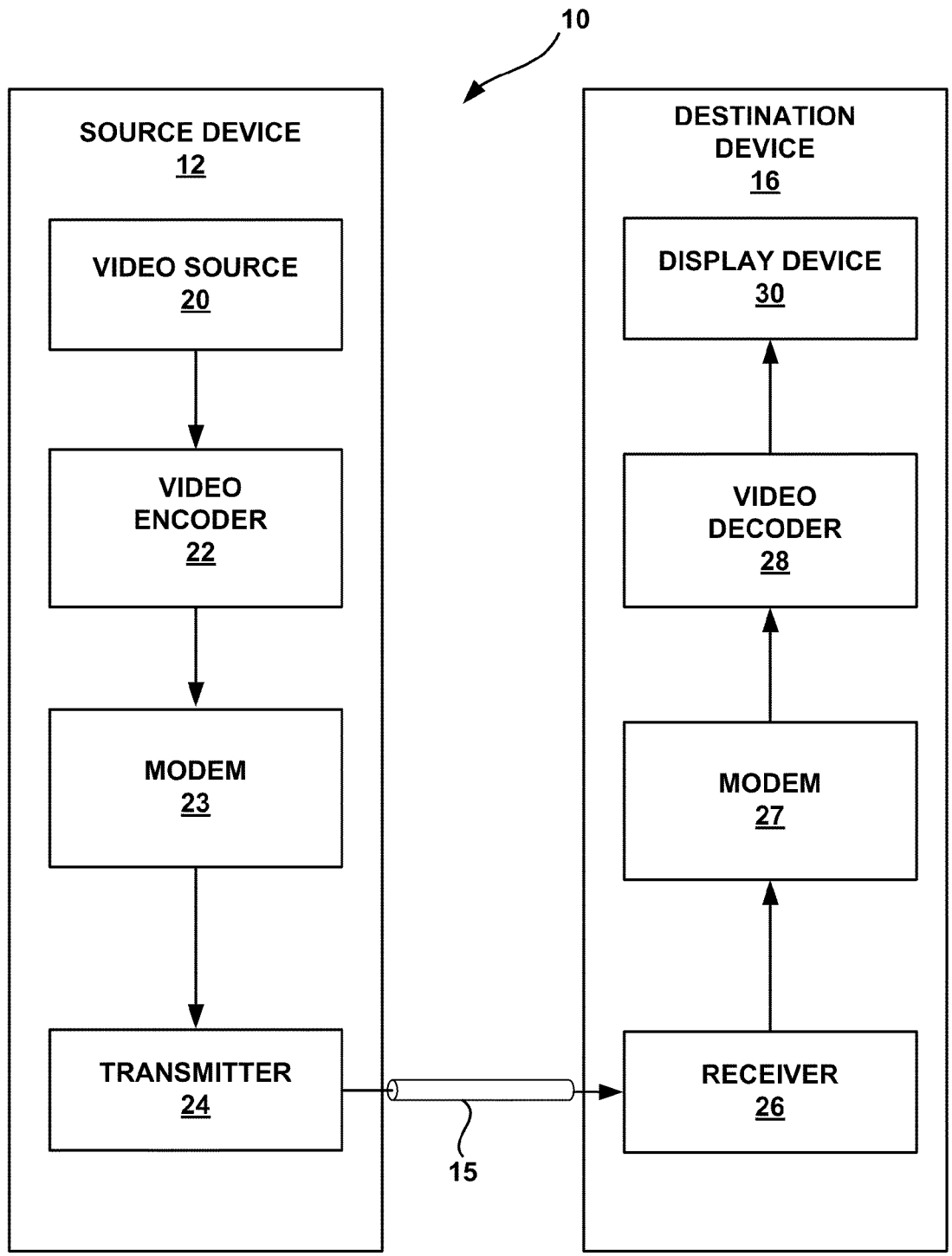
FIG. 1 is a block diagram illustrating an exemplary video encoding and decoding system that may implement techniques of this disclosure.

This disclosure describes techniques for encoding a two-dimensional (2D) video sequence of video frames along with three-dimensional (3D) conversion information comprising a set of parameters that can be applied to each of the video frames of the 2D sequence to generate 3D video data. The 3D conversion information does not differ with respect to different frames of the video sequence, but comprises a common set of parameters that form a relatively small amount of data that can be applied to each of the original video frames of the 2D sequence to generate secondary view video frames for each of the original video frames. The original video frames and the secondary view video frames may collectively define a stereoscopic 3D video sequence that can be rendered on a 3D display. Accordingly to this disclosure, the 2D sequence and the set of parameters may comprise significantly less data than would otherwise be needed to communicate a 3D sequence.

In one example, the 3D conversion information may comprise less than 20 bytes of data that can be applied to each of the original video frames of the 2D sequence to generate secondary views of each of the original video frames. The techniques of this disclosure may be useful in many coding settings, such as MPEG-2, MPEG-4, ITU H.263, ITU H.264, proprietary coding standards, or future coding standards. In accordance with the ITU H.264 framework, this disclosure may use supplemental enhancement information (SEI) messages as the mechanism for communicating 3D conversion information with a video standard-compliant 2D video sequence.

A receive device may decode and render the 2D sequence even if the receive device does not support 3D decoding or 3D rendering. However, if the receive device supports 3D decoding and 3D rendering consistent with this disclosure, the receive device may generate and render the 3D sequence based on the 2D sequence and the set of parameters. In this way, the techniques of this disclosure may support scalable 2D to 3D video coding in which the same bitstream can be used to render 2D video output or 3D video output. Moreover, as mentioned, the described techniques may reduce the amount of data needed for the communication of a 3D video sequence.

This disclosure also describes some exemplary syntax that may be used to encode the set of parameters in an effective and efficient manner. For example, in some implementations, syntax elements may be used in the SEI messages of ITU H.264 for communication of 3D conversion information. In one example, discussed in greater detail below, the 3D conversion information may comprise a first flag that indicates whether an explicit set of 3D parameters are included in the 3D conversion information or whether a default set of 3D parameters should be used, wherein the explicit set of 3D parameters are included in the 3D conversion information when the first flag is set. In this case, if the first flag is not set, then the decoder may still apply default 3D parameters.

The 3D conversion information may also comprise a second flag that indicates whether a second view of the 2D sequence should be generated left or right of the 2D sequence. In this case, the second flag may aid in 3D rendering by providing the orientation of secondary views that will be generated at the decoder (e.g., left or right of the original video frames). Furthermore, the 3D conversion information may comprise a third flag that identifies whether a crop region should be removed from the 3D video data, wherein information defining the crop region is included in the 3D conversion information when the third flag is set. If the third flag is not set, then cropping may be avoided in the generation of 3D video data and 3D rendering. In some cases, if the first flag is not set, then the second and third flags may be excluded from the bitstream. The flags may comprise single-bit or multi-bit flags.

FIG. 1 is a block diagram illustrating an exemplary video encoding and decoding system 10 that may implement techniques of this disclosure. As shown in FIG. 1, system 10 includes a source device 12 that transmits encoded video to a destination device 16 via a communication channel 15. Source device 12 and destination device 16 may comprise any of a wide range of devices, including mobile devices or generally fixed devices. In some cases, source device 12 and destination device 16 comprise wireless communication devices, such as wireless handsets, so-called cellular or satellite radiotelephones, personal digital assistants (PDAs), mobile media players, or any devices that can communicate video information over a communication channel 15, which may or may not be wireless. However, the techniques of this disclosure, which concern the generation, communication and use of 3D conversion information along with a 2D video sequence, may be used in many different systems and settings. FIG. 1 is merely one example of such a system.

In the example of FIG. 1, source device 12 may include a video source 20, video encoder 22, a modulator/demodulator (modem) 23 and a transmitter 24. Destination device 16 may include a receiver 26, a modem 27, a video decoder 28, and a display device 30. In accordance with this disclosure, video encoder 22 of source device 12 may be configured to encode a 2D sequence of video frames and encode 3D conversion information, wherein the 3D conversion information comprises a set of parameters that can be applied to each of the video frames of the 2D sequence to generate 3D video data. Modem 23 and transmitter 24 may modulate and transmit wireless signals to destination device. In this way, source device 12 communicates the encoded 2D sequence along with the 3D conversion information to destination device 16.

Receiver 26 and modem 27 receive and demodulate wireless signals received from source device 12. Accordingly, video decoder 28 may receive the 2D sequence and the 3D conversion information decoding the 2D sequence. According to this disclosure, video decoder 28 may generate the 3D video data based on the 2D sequence and the 3D conversion information. Again, the 3D conversion information may comprise a set of parameters that can be applied to each of the video frames of the 2D sequence to generate 3D video data, which may comprise significantly less data than would otherwise be needed to communicate a 3D sequence.

As mentioned, the illustrated system 10 of FIG. 1 is merely exemplary. The techniques of this disclosure may be extended to any coding device or technique that supports first order block-based video coding. Source device 12 and destination device 16 are merely examples of such coding devices in which source device 12 generates coded video data for transmission to destination device 16. In some cases, devices 12, 16 may operate in a substantially symmetrical manner such that, each of devices 12, 16 includes video encoding and decoding components. Hence, system 10 may support one-way or two-way video transmission between video devices 12, 16, e.g., for video streaming, video playback, video broadcasting, or video telephony.

Video source 20 of source device 12 may include a video capture device, such as a video camera, a video archive containing previously captured video, or a video feed from a video content provider. As a further alternative, video source 20 may generate computer graphics-based data as the source video, or a combination of live video, archived video, and computer-generated video. In some cases, if video source 20 is a video camera, source device 12 and destination device 16 may form so-called camera phones or video phones. In each case, the captured, pre-captured or computer-generated video may be encoded by video encoder 22. The encoded video information may then be modulated by modem 23 according to a communication standard, e.g., such as code division multiple access (CDMA) or another communication standard, and transmitted to destination device 16 via transmitter 24. Modem 23 may include various mixers, filters, amplifiers or other components designed for signal modulation. Transmitter 24 may include circuits designed for transmitting data, including amplifiers, filters, and one or more antennas.

Receiver 26 of destination device 16 receives information over channel 15, and modem 27 demodulates the information. Again, the video encoding process may implement one or more of the techniques described herein to determine a set of parameters that can be applied to each of the video frames of the 2D sequence to generate 3D video data. The information communicated over channel 15 may include information defined by video encoder 22, which may be used by video decoder 28 consistent with this disclosure. Display device 30 displays the decoded video data to a user, and may comprise any of a variety of display devices such as a cathode ray tube, a liquid crystal display (LCD), a plasma display, an organic light emitting diode (OLED) display, or another type of display device.

In the example of FIG. 1, communication channel 15 may comprise any wireless or wired communication medium, such as a radio frequency (RF) spectrum or one or more physical transmission lines, or any combination of wireless and wired media. Accordingly, modem 23 and transmitter 24 may support many possible wireless protocols, wired protocols or wired and wireless protocols. Communication channel 15 may form part of a packet-based network, such as a local area network (LAN), a wide-area network (WAN), or a global network, such as the Internet, comprising an interconnection of one or more networks. Communication channel 15 generally represents any suitable communication medium, or collection of different communication media, for transmitting video data from source device 12 to destination device 16. Communication channel 15 may include routers, switches, base stations, or any other equipment that may be useful to facilitate communication from source device 12 to destination device 16. The techniques of this disclosure do not necessarily require communication of encoded data from one device to another, and may apply to encoding scenarios without the reciprocal decoding. Also, aspects of this disclosure may apply to decoding scenarios without the reciprocal encoding.

Video encoder 22 and video decoder 28 may operate consistent with a video compression standard, such as the ITU-T H.264 standard, alternatively described as MPEG-4, Part 10, Advanced Video Coding (AVC). The techniques of this disclosure, however, are not limited to any particular coding standard or extensions thereof. Although not shown in FIG. 1, in some aspects, video encoder 22 and video decoder 28 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

Work to advance the H.264/MPEG-4 AVC standard takes place in various forums of the ITU-T, such as the Key Technologies Area (KTA) forum. The KTA forum seeks, in part, to develop coding technologies that exhibit higher coding efficiency than that exhibited by the H.264/AVC standard. The techniques described in this disclosure may provide for coding improvements relative to the H.264/AVC standard particularly for 3D video. In some aspects, this disclosure contemplates the use of supplemental enhancement information (SEI) messages within the ITU-T H.264 framework as the mechanism for encoding and communicating the 3D conversion information described herein.

Video encoder 22 and video decoder 28 each may be implemented as one or more microprocessors, digital signal processors (DSPs), application specific integrated circuits (ASICs), field programmable gate arrays (FPGAs), discrete logic circuitry, software executing on a microprocessor or other platform, hardware, firmware or any combinations thereof. Each of video encoder 22 and video decoder 28 may be included in one or more encoders or decoders, either of which may be integrated as part of a combined encoder/decoder (CODEC) in a respective mobile device, subscriber device, broadcast device, server, or the like.

A video sequence typically includes a series of video frames. Video encoder 22 and video decoder 28 may operate on video blocks within individual video frames in order to encode and decode the video data. The video blocks may have fixed or varying sizes, and may differ in size according to a specified coding standard. Each video frame may include a series of slices or other independently decodable units. Each slice may include a series of macroblocks, which may be arranged into sub-blocks. As an example, the ITU-T H.264 standard supports intra prediction in various block sizes, such as 16 by 16, 8 by 8, or 4 by 4 for luma components, and 8×8 for chroma components, as well as inter prediction in various block sizes, such as 16 by 16, 16 by 8, 8 by 16, 8 by 8, 8 by 4, 4 by 8 and 4 by 4 for luma components and corresponding scaled sizes for chroma components. Video blocks may comprise blocks of pixel data, or blocks of transformation coefficients, e.g., following a transformation process such as discrete cosine transform or a conceptually similar transformation process.

Smaller video blocks can provide better resolution, and may be used for locations of a video frame that include high levels of detail. In general, macroblocks and the various sub-blocks or partitions may all be considered to be video blocks. In addition, a slice may be considered to be a series of video blocks, such as macroblocks and/or sub-blocks or partitions. In general a macroblock may refer to a set of chrominance and luminance values that define a 16 by 16 area of pixels. A luminance block may comprise a 16 by 16 set of values, but may be further partitioned into smaller video blocks, such as 8 by 8 blocks, 4 by 4 blocks, 8 by 4 blocks, 4 by 8 blocks or other sizes. Two different chrominance blocks may define color for the macroblock, and may each comprise 8 by 8 sub-sampled blocks of the color values associated with the 16 by 16 area of pixels. Macroblocks may include syntax information to define the coding modes and/or coding techniques applied to the macroblocks.

Macroblocks or other video blocks may be grouped into decodable units such as slices, frames or other independent units. Each slice may be an independently decodable unit of a video frame. Alternatively, frames themselves may be decodable units, or other portions of a frame may be defined as decodable units. In this disclosure, the term "coded unit" refers to any independently decodable unit of a video frame such as an entire frame, a slice of a frame, a group of pictures (GOPs), or another independently decodable unit defined according to the coding techniques used.

Following intra- or inter-based predictive encoding, and following any transforms (such as the 4×4 or 8×8 integer transform used in H.264/AVC or a discrete cosine transform or DCT), quantization may be performed. Quantization generally refers to a process in which coefficients are quantized to possibly reduce the amount of data used to represent the coefficients. The quantization process may reduce the bit depth associated with some or all of the coefficients. For example, a 16-bit value may be rounded down to a 15-bit value during quantization. Following quantization, entropy coding may be performed, e.g., according to content adaptive variable length coding (CAVLC), context adaptive binary arithmetic coding (CABAC), or another entropy coding methodology.

3D video may require one or more additional video frames (e.g., additional views) associated with each originally encoded frame. Two different views, for example, may be used to define a stereoscopic 3D rendition of a video frame. Multiple views, which may comprise three or more views, may also support multi-view 3D renditions. The different views of 3D video may have similar timing such that two or more views correspond to the same time instance of a video sequence. In this way, two or more views may generally define two or more 2D sequences that together form a 3D sequence that can be collectively rendered to provide 3D video.

In order to support efficient encoding, communication and decoding of 3D video, this disclosure uses 3D conversion information comprising a set of parameters that can be applied to each of the video frames of the 2D sequence to generate 3D video data. Such 3D conversion information may be communicated with a 2D sequence. Accordingly, a receiving device can generate and display the 2D sequence, or if the receiving device supports 3D video, the receiving device can generate and display the 3D sequence. In some examples, the 3D conversion information of this disclosure may comprise less than 100 bytes of data, and more specifically, less than 20 bytes of data, which can be applied to some or all of the 2D frames of a 2D sequence to generate secondary views for 3D stereoscopic video. In this way, by eliminating transmission of two views for at least some frames, the techniques of this disclosure provide an efficient way to communicate 3D video.

Figure 2:
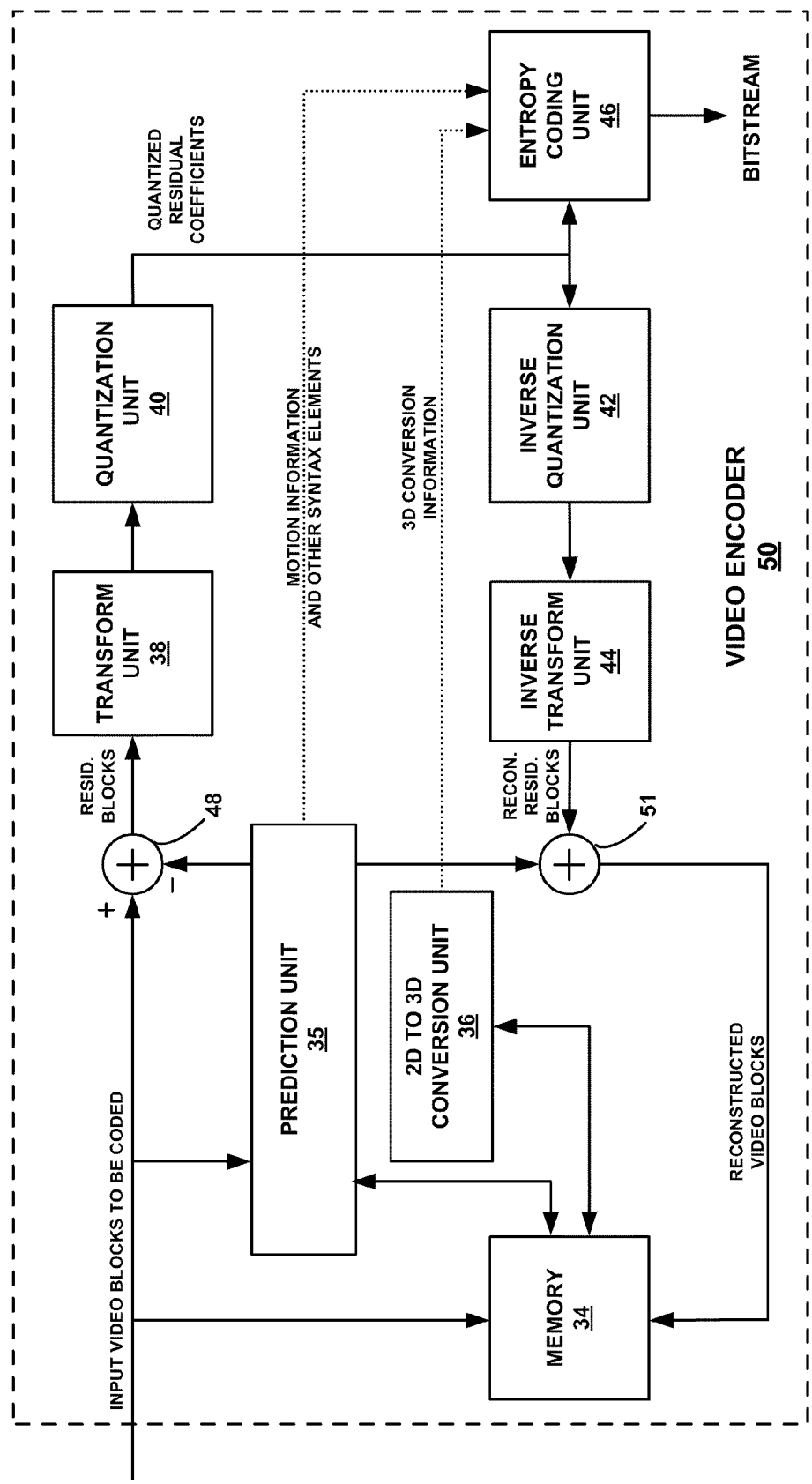
FIG. 2 is a block diagram illustrating an exemplary video encoder that may perform two-dimensional (2D) and three-dimensional (3D) video encoding consistent with this disclosure.

FIG. 2 is a block diagram illustrating an example of a video encoder 50 that may perform techniques consistent with this disclosure. Video encoder 50 may correspond to video encoder 22 of source device 12, or a video encoder of a different device. Video encoder 50 may perform intra- and inter-coding of blocks within video frames. Intra-coding relies on spatial prediction to reduce or remove spatial redundancy in video within a given video frame. Inter-coding relies on temporal prediction to reduce or remove temporal redundancy in video within adjacent frames of a video sequence. Intra-mode (I-mode) may refer to the spatial based compression mode and Inter-modes such as prediction (P-mode) or bi-directional (B-mode) may refer to the temporal based compression modes.

As shown in FIG. 2, video encoder 50 receives a current video block within a video frame or slice to be encoded. In the example of FIG. 2, video encoder 50 includes a prediction unit 35, a memory 34, an adder 48, a transform unit 38, a quantization unit 40, and an entropy coding unit 46. For video block reconstruction, video encoder 50 also includes an inverse quantization unit 42, an inverse transform unit 44, and an adder 51. Moreover, according to this disclosure, video encoder 50 may include a 2D to 3D conversion unit 36, which generates the 3D conversion information described herein. Video encoder 50 may also include other components, such as a deblocking filter (not shown) to filter block boundaries to remove blockiness artifacts from reconstructed video. If desired, the deblocking filter would typically filter the output of adder 51.

During the encoding process, video encoder 50 receives a video block to be coded, and prediction unit 35 performs intra- or inter-predictive coding. For example, prediction unit 35 of encoder 50 may perform motion estimation and motion compensation for each video block or video block partition of a coded unit (e.g., a frame or slice). Prediction unit 35 may calculate a rate-distortion cost (rdcost) for each applicable mode associated with encoding a particular block, and may select the coding mode that yields the lowest costs. The rdcost may quantify the cost in terms of the number of bits used and the level of distortion in the coded data relative to the original video data.

Rate-distortion (RD) analysis is fairly common in video coding, and generally involves the calculation of a cost metric indicative of the coding cost. The cost metric may balance the number of bits required for the coding (the rate) and the level of quality associated with the coding (the distortion). A typical rate-distortion cost calculation may generally correspond to the format of:

$$J(\lambda)=\lambda R+D,$$

where $J(\lambda)$ is the cost, R is the bit rate, D is the distortion, and $\lambda$ is the Lagrange multiplier. Prediction unit 35 may apply this type of cost function to compare various intra- and inter-coding modes (and applicable partition sizes) that can be use to perform the video block encoding.

Once the desired prediction data is identified by prediction unit 35 video encoder 50 forms a residual video block by subtracting the prediction data from the original video block being coded to generate a residual block. Adder 48 represents the component or components that perform these subtraction operations. Transform unit 38 applies a transform, such as a discrete cosine transform (DCT) or a conceptually similar transform, to the residual block, producing a video block comprising residual transform block coefficients. Transform unit 38 may perform transforms such as those defined by the H.264 standard, which are conceptually similar to DCT. Wavelet transforms, integer transforms, sub-band transforms or other types of transforms could also be used. In any case, transform unit 38 applies the transform to the residual block, producing a block of residual transform coefficients. The transform may convert the residual information from a pixel domain to a frequency domain.

Quantization unit 40 quantizes the residual transform coefficients to further reduce bit rate. The quantization process may reduce the bit depth associated with some or all of the coefficients. For example, a 9-bit value may be rounded down to an 8-bit value during quantization. In addition, quantization unit 40 may also quantize the different offsets for cases where offset is used.

Following quantization, entropy coding unit 46 entropy codes the quantized transform coefficients. For example, entropy coding unit 46 may perform content adaptive variable length coding (CAVLC), context adaptive binary arithmetic coding (CABAC), or another entropy coding methodology. Following the entropy coding by entropy coding unit 46, the encoded video may be transmitted to another device or archived for later transmission or retrieval. The coded bitstream may include entropy coded residual blocks, motion vectors for such blocks, and other syntax such as the syntax described herein for supporting 2D to 3D video.

Inverse quantization unit 42 and inverse transform unit 44 apply inverse quantization and inverse transformation, respectively, to reconstruct the residual block in the pixel domain, e.g., for later use as the reference data in the manner described above. Adder 51 adds the reconstructed residual block to first and/or second order prediction blocks produced by motion compensation unit 35 to produce a reconstructed video block for storage in memory 34. The reconstructed video block and residual data may be used by motion compensation unit 35 as a reference block to inter-encode a block in a subsequent video frame or other coded unit.

To support 3D video, video encoder 50 may further include a 2D to 3D conversion unit 36, which operates with respect to the reconstructed 2D video sequence stored in memory 34. In this way, 2D to 3D conversion unit 36 operates on the same reconstructed data that will be available at a decoder following a decoding process. In accordance with this disclosure, 2D to 3D conversion unit 36 identifies, determines, or otherwise generates 3D conversion information comprising a set of parameters that can be applied to each of the video frames of the 2D sequence to generate 3D video data. The 3D conversion information may be generated once for a given 2D sequence.

The 2D sequence to which the 3D conversion information applies may comprise an entire video sequence, a scene, or possibly a group of pictures that form a decodable set. Examples of groups of pictures include sets of five frames in an IBPBP scenario or sets of seven frames in an IBBPBBP scenario, where I indicates intra-coding, P indicates predictive inter-coding or uni-direction inter-coding, and B indicates bi-predictive inter-coding or bi-directional inter-coding. In these cases, the frames in the group of pictures are interdependent and collectively decodable. In some cases, the 3D conversion information may be sent once per group of pictures, although the 3D conversion information could also be sent once per scene or once per entire video sequence. Importantly, however, the 3D conversion information applies with respect to a plurality of frames so that different 3D conversion information is not needed for each individual frame of the plurality of frames.

Video encoder 50 may encode the 2D sequence according to an ITU H.264 video encoding standard, and 2D to 3D conversion unit may encode the 3D conversion information SEI messages supported by the ITU H.264 video encoding standard. The set of parameters can be applied to each of the video frames of the first 2D sequence to generate a second 2D sequence of video frames, wherein the first and second 2D sequences collectively define a 3D stereoscopic video sequence. The 3D conversion information may include information identifying a 3D conversion process to be applied on the 2D sequence to generate the 3D video data. In some cases, the 3D conversion information may include camera parameters and values associated with capturing the 2D sequence. For example, as explained in greater detail below, the 3D conversion information may include a focal length value indicative of a focal length associated with a camera that captured the 2D sequence, a near-depth value that specifies a minimum depth in the 3D video data, a far-depth value that specifies a maximum depth in the 3D video data, and a translate value that quantifies an assumed distance between two cameras associated with the 3D video data.

To encode the 3D conversion information, 2D to 3D conversion unit 36 may use flags, which are bits that may be set to indicate particular scenarios. As example, the 3D conversion information may include a flag that indicates whether explicit set of 3D parameters are included in 3D conversion information or whether a default set of 3D parameters should be used. In this case, the explicit set of 3D parameters are included in the 3D conversion information when the flag is set. Also, the 3D conversion information may include a flag that indicates whether a second view of the 2D sequence should be generated left or right of the 2D sequence. In addition, the 3D conversion information may include a flag that identifies a crop region that should be removed from the 3D video data. In this case, information defining the crop region is included in the 3D conversion information when the flag is set. Each of these flags may be used to collectively encode 3D conversion information, and other flags may also be used or defined consistent with this disclosure.

Figure 3:
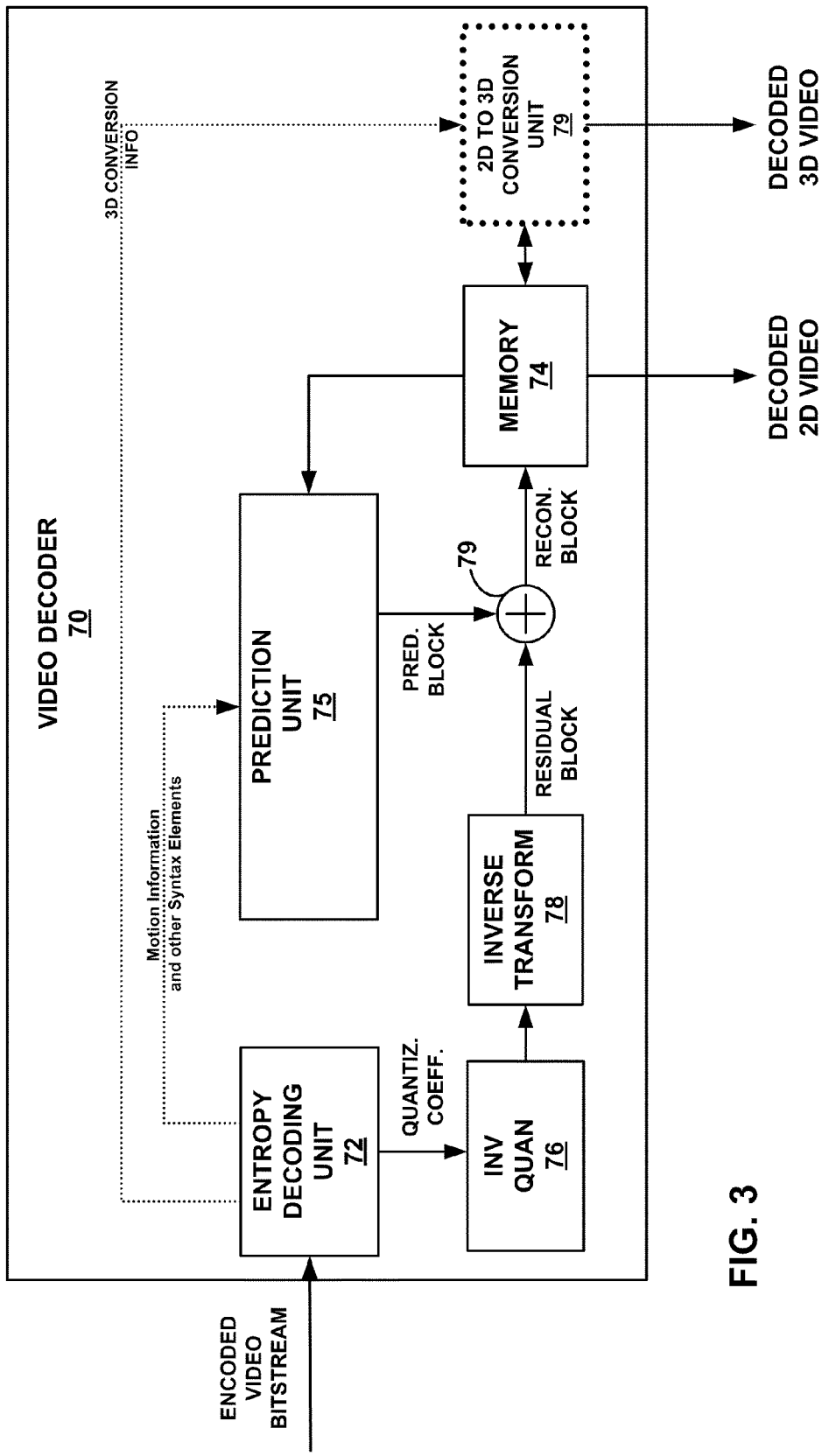
FIG. 3 is a block diagram illustrating an exemplary video decoder that may perform 2D and 3D video decoding consistent with this disclosure.

FIG. 3 is a block diagram illustrating an exemplary video decoder 70, which may perform the reciprocal decoding techniques to the encoding techniques described above. Video decoder 70 may include an entropy decoding unit 72, a prediction unit 75, an inverse quantization unit 76, an inverse transform unit 78, a memory 74 and adder 79. Prediction unit 75 may include a motion compensation unit, as well as spatial prediction components.

Video decoder 70 may receive an encoded video bitstream that includes a 2D sequence encoded in the manner described herein, and various syntax elements that may be used by decoder 70 to facilitate the proper decoding of the video blocks. More specifically, the video bitstream may include the 3D conversion information described herein to facilitate the generation of 3D video data based on the 2D sequence of video frames. The 3D conversion information may comprise a set of parameters that can be applied to each of the video frames of the 2D sequence to generate 3D video data. Again, the 3D conversion information does not differ for the different frames of the video sequence, but comprises a common set of parameters that form a relatively small amount of data that can be applied to each of the original video frames of the 2D sequence to generate secondary views of each of the original video frames. The phrase 2D sequence refers to a plurality of video frames, which may comprise an entire video file, a video clip, a video scene within a larger video file, or possibly a group of pictures that form a decodable set of frames within a larger video sequence.

Entropy decoding unit 72 performs entropy decoding of the bitstream to generate quantized coefficients for residual video blocks of a 2D sequence. Entropy coding unit 72 may parse syntax elements from the bitstream and forward such syntax element to various units of video decoder 70. Motion information (e.g., motion vectors) and other syntax information, for example, may be forwarded to prediction unit 75. Moreover, 3D conversation information may be parsed from the bitstream by entropy decoding unit 72, and then forwarded to 2D to 3D conversion unit 79. 2D to 3D conversion unit 79 is illustrated in broken lines insofar as this unit 79 is optional. A video decoder without any 2D to 3D conversion unit 79 might simply decode the 2D video sequence and discard the 3D conversion information. In this way, the 3D conversion information facilitates scalable 2D to 3D video in which some devices may decode 2D video, while other devices may decode the 2D video and also apply the 3D conversion information to generate 3D video.

In order to decode the 2D video sequence, prediction unit 75 uses the motion information or other syntax elements to identify a prediction block that was used in the encoding. For inter-based decoding, the motion vector may be applied in a motion compensation process to generate the prediction block from one or more lists of prediction data. For inter-based decoding, the syntax may comprise an intra mode, which may define how the prediction block should be generated based on data from the same frame as that of the video block being decoded.

Inverse quantization unit 76 inverse quantizes data from entropy decoding unit 72, and inverse transform unit performs an inverse transform to generate the residual block in the pixel domain. Adder 79 then combines the residual block with the prediction block generated by prediction unit 75 to generate a reconstruction of the original video block, which may be stored in memory 74 and/or output to a display as decoded 2D video data. Many video blocks may be decoded in this way to reconstruct video frames and ultimately reconstruct an entire 2D sequence of video frames in memory 74. In this way, video decoder 70 performs the reciprocal decoding relative to the encoding performed by video encoder 50 described previously.

According to this disclosure, 2D to 3D conversation unit 79 may apply the 3D conversion information, which was sent in the bitstream, to the decoded 2D video sequence stored in memory 74. For example, in applying the 3D conversion information to the decoded 2D video sequence stored in memory 74, 2D to 3D conversation unit 79 may generate secondary views associated with some or all of the video frames in the 2D sequence. The original views and secondary views may then be output from 2D to 3D conversation unit 79 as 3D video data.

Multi-view video coding (MVC) may form an extension to H.264/AVC, although MVC could also be applied with respect to other video coding standards. One joint draft of MVC is in described in JVT-AB204, "Joint Draft 8.0 on Multiview Video Coding," 28$^{th}$ JVT meeting, Hannover, Germany, July 2008. Consistent with H.264/AVC, coded video bits may be organized into Network Abstraction Layer (NAL) units, which provide a "network-friendly" video representation addressing the applications such as video telephony, storage, broadcast, or streaming. NAL units can be categorized to Video Coding Layer (VCL) NAL units and non-VCL NAL units. VCL units may contain the core compression engine and comprise block, MB and slice levels. Other NAL units are non-VCL NAL units.

In compliance with H.264/AVC, supplemental enhancement information (SEI) messages may contain information that is not necessary to decode the samples of coded pictures from VCL NAL units. SEI messages are also contained in non-VCL NAL units. SEI messages are a normative part of the standard specification for H.264/AVC. While not mandatory for standard-compliant decoder implementation, SEI messages may assist in processes related to decoding, display, error resilience and other purposes. Although the mandatory part of H.264/AVC has been finalized, the H.264/AVC specification is still open for SEI messages. This disclosure, in some aspects, proposes the use of SEI messages or other similar messages as the mechanism for encoding, communicating and decoding the 3D conversion information described herein.

To support 3D video format, JVT and MPEG may introduce new standards and features. Consistent with a MPEG-2 multiview profile, for example, one view, e.g., the left view may be coded in a reduced frame rate (e.g., 15 frames per second) and the other view may be coded as a temporal enhancement layer that requires a high frame rate (e.g., 30 frames per second). However, this requires the communication of both views in the bitstream, which can significantly increase the amount of data in the bitstream relative to the communication of a conventional 2D sequence.

H.264/AVC may also apply stereoscopic video content approaches. In H.264/AVC, for example, the stereo video information SEI message could be adopted to indicate how two views are arranged in one bitstream. In this case, the two views may be alternating frames or complementary field pairs. When two views are alternating frames, two views are ordered in a temporal interleaving mode, and when the two views for complementary field pairs, an image pair from two views are actually row interleaved in one picture. Again, however, this requires the communication of both views in the bitstream, which can significantly increase the amount of data in the bitstream relative to the communication of a conventional 2D sequence.

It may be possible to adopt spatial interleaving of pictures and may signal the presence of spatial interleaving in the SEI, which extends the support of two views from temporal interleaving and row interleaving into more flexible spatial interleaving modes. Alternatively, the SEI message may support the combining of an image pair as side-by-side interleaving, above/below interleaving, column interleaving or checkerboard interleaving. In each of these approaches, like other undesirable approaches, the different views are actually transmitted in the bitstream in some way, which drastically increases the amount of information needed for 3D video relative to a conventional 2D sequence.

The techniques of this disclosure may substantially reduce the amount of information needed in the bitstream to convey 3D video by avoiding the actual transmission of the secondary views. In this case, rather than actually encode and transmit the secondary views, this disclosure sends 3D conversion information comprising a set of parameters that may be applied to the original 2D sequence at the decoder to generate the secondary views at the decoder. In this way, the need to actually convey the secondary views is avoided, and instead, the set of parameters can be applied at the decoder to generate the secondary views without needing to convey the secondary views in the bitstream.

SEI messages in H.264/AVC may also support a case that accepts a 3D input as if it was a 2D video sequence and utilizes an SEI message to tell the decoder how to separate the two interleaved views so that one video sequence can be partitioned into two views. It should be emphasized again, however, that the input to such a case is a 3D input which is represented by two views. The techniques of this disclosure, in contrast, avoid the need to send two views in the bitstream, and instead rely on the decoder to generate any secondary views based on 3D conversion information in the bitstream.

Some MVC decoding orders may be referred to as time-first coding. In this case, each access unit is defined to contain the coded pictures of all the views for one output time instance. However, the decoding order of access units may not be identical to the output or display order.

MVC prediction may include both inter-picture prediction within each view and inter-view prediction. MVC may include a so-called base view which is decodable by H.264/AVC decoders, and two views could be supported also by MVC. In this case, the advantage of MVC is that it could support a case that takes more than two views as a 3D video input and decodes this 3D video represented by the multiple views. Decoding by an MVC decoder may expect the 3D video content with multiple views.

The MPEG standards have also specified a format for attaching a depth map for a regular video stream in MPEG-C part 3. This specification is included in the following:

"Text of ISO/IEC FDIS 23002-3 Representation of Auxiliary Video and Supplemental Information," ISO/IEC JTC 1/SC 29/WG 11, MPEG Doc, N8768, Marrakech, Morocoo, January 2007.

In MPEG-C part 3, a so-called auxiliary video can be either a depth map, or a parallax map. Representing a depth map may provide flexibility in terms of number of bits used to represent each depth value and resolution of depth map. For example, the depth map may be one-forth of a width and one half of a height of a given image. Unfortunately, depth maps are typically required for every frame of sequence. That is, the same depth map does not apply to every frame of the video sequence. Accordingly, communication of depth maps can amount to a very significant amount of data since several depth maps are needed over an entire video sequence.

The MPEG video subgroup has defined exploration experiments in 3D video coding in order to study 3D scenarios. The MPEG video subgroup has indicated that having depth maps for each view is potentially helpful for view synthesis, although this activity in MPEG may not be part of standardization. Consistent with MPEG 3D video, two important concepts include depth estimation and view synthesis. It may be assumed that most of the video contents are captured by a multi-camera system and depth maps must be generated prior to the coding so that such depth maps can be transmitted with the texture video sequences. View synthesis according to this disclosure, however, is a tool that may be applied at the time of video rendering to generate more views that are not transmitted in the bitstream. Accordingly, the concept of view synthesis may form part of the techniques of this disclosure by facilitating the 3D conversion information described herein.

In 3D video communication systems, raw video data may be captured and pre-processed before encoding. The raw data, which may have depth maps, may be encoded and the encoded video content may be stored or transmitted. A destination device may decode and display the 3D video. As explained above, however, it may be undesirable from a communication and bandwidth standpoint, to communicate additional views or depth maps for several images of a video sequence. A better approach, according to this disclosure, may be to communicate 3D conversion information that can be applied to every video frame of a 2D sequence, e.g., by the decoder, to generate the secondary views without needing to actually communicate the secondary views in the bitstream.

Acquisition of 3D content may be performed one camera or by a camera array, or may even be associated with devices that can produce depth maps. As a few examples, content acquisition may be categorized within at least one of the following categories:
- 2D video capture, which normally does not provide for 3D content.
- Two-camera systems that can capture and/or provide stereoscopic video.
- Camera arrays, which capture multiple views.
- One view capture plus depth. E.g., some devices may capture the depths associated with captured images.
- Other techniques may capture depth information and/or generate a 3D model.

3D pre-processing and encoding may also be performed at the encoder. Here, the 3D pre-processing does not refer to typical processing that is related to noise deduction or scene detection. 3D pre-processing may generate depth maps, which are to be coded as part of the 3D video content. This process can produce one depth map for every captured view or depth maps for several transmitted views. Again, however, communication of depth maps may be undesirable from a bandwidth standpoint.

When a video content is received by a decoder, it can be decoded to get the transmitted data, which may include one or more views as well as the reconstructed depth maps, if any. When depth maps are available at the decoder, a view synthesis algorithm can be adopted to generate the texture for other views that have not been transmitted. Normal 3D displays may render two or more views. Some 2D displays capable of displaying high frame rate videos can also be used as a 3D display with the help of shuttle glasses. Polarization is a 3D display technique that provides two views as output. Although some displays or 3D television take depth as part of the input, there may always be a built in "view synthesis" module which is responsible for generating two or more views as output.

3D warping is one form of view synthesis that may be useful to the techniques of this disclosure. FIGS. 4-7 are conceptual drawings that will be used to explain 3D warping and other view synthesis concepts. View synthesis based on sampling theory can be a sampling problem, which requires densely sampled views to generate any view in any view angle perfectly. In practical applications, however, the storage or transmission bandwidth required by the densely sampled views is typically too huge to be realized. Therefore, some research has focused on view synthesis based on sparsely sampled views and depth maps.

Figure 4:
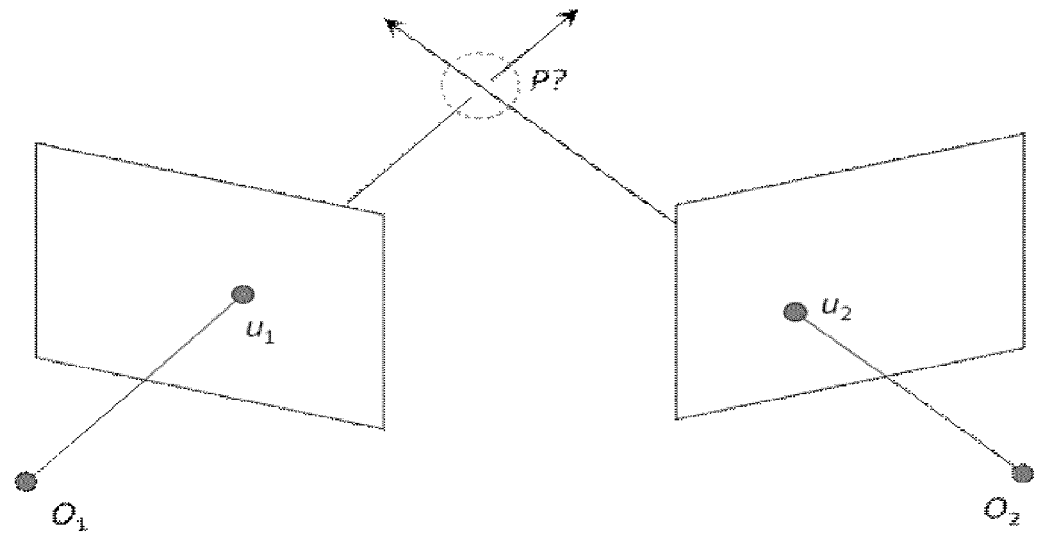
FIGS. 4-6 are conceptual diagrams illustrating aspects of 2D to 3D conversion that may be applied based on 3D conversion parameters.
Figure 5:
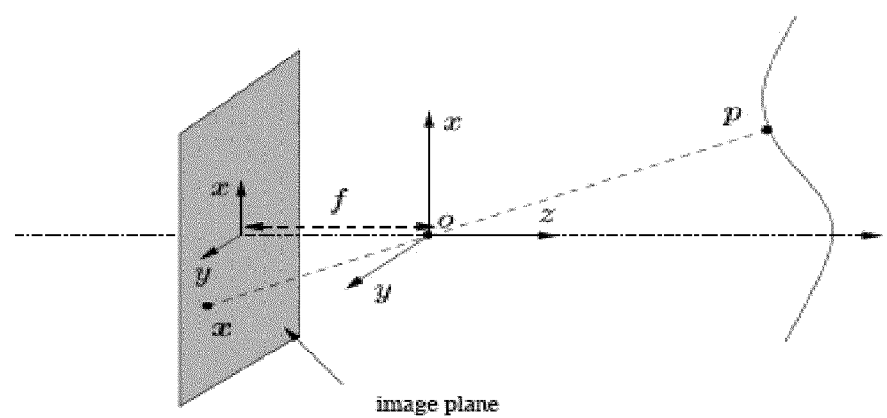

View synthesis algorithms based on sparsely sampled views may rely on the concept of 3D warping. FIG. 4 illustrates the concept of 3D warping. As shown in FIG. 4, in 3D warping, given the depth and the camera model, a pixel in $\overline{u_1}$ of a reference view can be projected from the 2D camera coordinate to the point P in a world-space coordinate system. The point P may then be projected to the destination view (which is the virtual view to be generated) along the direction of $\overrightarrow{PO_2}$. In this case, the direction of $\overrightarrow{PO_2}$ corresponds to the view angle of the destination view. By assuming that the projected coordinate is $\overline{u_2}$, then the pixel values (in different color components) of the $\overline{u_1}$ in the reference view can be considered as the pixel values for $\overline{u_2}$ in the virtual view.

Sometimes, more than one view can be considered as reference views. In other words, the above mentioned projection from $\overline{u_1}$ to $\overline{e_2}$ is not necessarily a one-to-one projection. When more than one pixel is projected to the destination pixel $\overline{u_2}$, however, a visibility problem may occur. On the other hand, when one pixel is projected to a destination pixel $\overline{u_2}$, a hole may emerge or exist in the picture of the virtual view. The so-called visibility problem may require decisions with respect to which pixels to use to construct the pixel values for $\overline{u_2}$. If the holes exist in a picture in a continuous area, the phenomena is called occlusion. Otherwise, if the holes are distributed sparsely in a picture, the holes may be called pinholes. Occlusion can be solved by introducing one reference view in a different direction. Pinhole filling (e.g., to fill pixel values of the pinholes) usually takes neighboring pixels as candidates for a hole. The techniques for pinhole filling can also be used to solve the occlusion problems.

When more than one pixel is considered for the pixel values of $u_2$, weighted average methods may be adopted. These processes are typically named reconstruction in view synthesis. In all, visibility, occlusion, pinhole filling and reconstruction represent the major issues and hurdles in implementation of 3D warping based view synthesis. A camera model may help to address such issues.

A camera model containing intrinsic and extrinsic parameters, for example, may be used to describe the transformation from the world coordinate system to the camera plane, or vice verse. For simplicity, all the mentioned coordinate systems described in this disclosure are orthogonal coordinate systems, although the techniques of this disclosure are not necessarily limited in this respect.

The extrinsic parameters can define the position of the camera center and the heading of the camera in world coordinates, based on the following transform:

$$\begin{pmatrix} x \\ y \\ z \\ 1 \end{pmatrix} = A \begin{pmatrix} x_w \\ y_w \\ z_w \\ 1 \end{pmatrix} \quad (1)$$

where in $(x\ y\ z)^T$ is the coordinate in the 3D camera coordinate system and $(x_w\ y_w\ z_w)^T$ is the coordinate in the world coordinate system. The matrix A may comprise a 4×4 matrix and may be an orthonormal transform that can be illustrated as follows:

$$A = \begin{pmatrix} R & T \\ 0 & 1 \end{pmatrix} \quad (2)$$

where R is a 3×3 rotation matrix and T is the translation. In this case, T is not the position of the camera.

Figure 6:
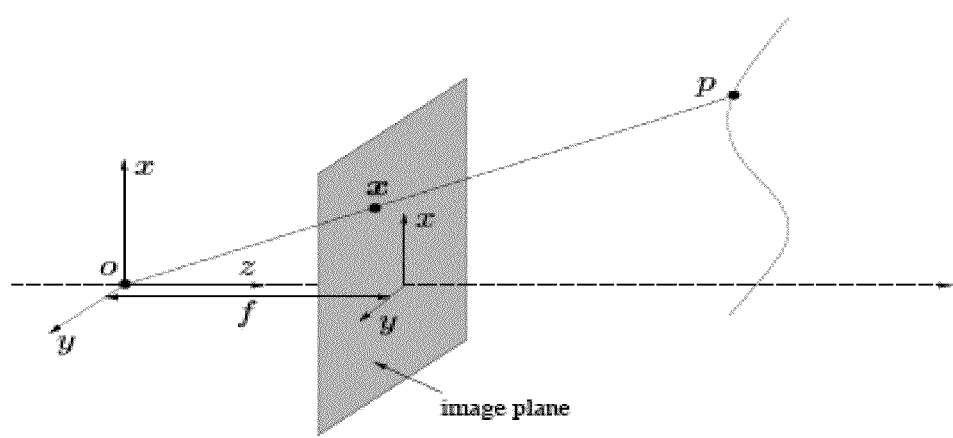

In the 3D camera coordinate system, the z axis may be called the principal optical axis, and the x and y axes can define the image plane. For example, as shown in FIG. 6, $\overrightarrow{O_1P}$ may define the principal optical axis. The plane perpendicular to the principal optical axis, which contains $u_1$ may define the image plane.

The world coordinate system can be defined to be the same as the 3D camera coordinate system of a camera. In this case, A=I. If a 3D camera coordinate system is translated from the world coordinate system, then:

$$A = \begin{pmatrix} I & T \\ 0 & 1 \end{pmatrix}, \quad (3)$$

and $(x\ y\ z)^T = (x_w\ y_w\ z_w)^T + T^T$.

An intrinsic parameter specifies the transformation from a 3D camera coordinate system to a 2D image plane. A model for this conversion may be referred to as a pinhole camera model, which is conceptually illustrated in FIG. 5. In this case, O is the origin of the 3D camera coordinate system, which may define the center of the camera plane (or sensor plane). In such a model, $$\frac{u}{x} = \frac{v}{y} = \frac{-f}{z},$$

wherein $-f$ refers to the focal length and $(u,v)^T$ refers to the coordinates in the image plane.

The pinhole camera model may be inconvenient in that the focal length f is negative. To address this concern, the pinhole camera model may also be also represented in a frontal pinhole camera model, as shown in FIG. 6. In the frontal pinhole camera model, the relationship becomes $$\frac{u}{x} = \frac{v}{y} = \frac{f}{z}.$$

This transformation can be denoted as:

$$\begin{pmatrix} u \\ v \\ 1 \end{pmatrix} = \begin{pmatrix} fx \\ fy \\ z \end{pmatrix} = Q \begin{pmatrix} x \\ y \\ z \end{pmatrix} = \begin{pmatrix} f & 0 & 0 \\ 0 & f & 0 \\ 0 & 0 & 1 \end{pmatrix} \begin{pmatrix} x \\ y \\ z \end{pmatrix} \quad (4)$$

where in $(u, v)$ are the coordinates in the image plane and Q is a simplest representation of the intrinsic parameters. If one denotes $\bar{u}=(u\ v\ 1)^T$, then the whole transform from the world coordination system to the image plane is given by:

$$\bar{u} = Q\begin{pmatrix} x \\ y \\ z \end{pmatrix}, \begin{pmatrix} x \\ y \\ z \\ 1 \end{pmatrix} = A\begin{pmatrix} x_w \\ y_w \\ z_w \\ 1 \end{pmatrix} \quad (5)$$

In some implementations, the intrinsic camera parameter can be more complex than described above. The transform described above as Q may be given by:

$$Q = \begin{pmatrix} f_x & \text{Skew} & \text{principal}_x \\ 0 & f_y & \text{principal}_y \\ 0 & 0 & 1 \end{pmatrix} \quad (6)$$

In this case, Skew refers to a skew factor of the camera and $(\text{principal}_x, \text{principal}_y)^T$ is the coordinate of the principal point in the image plane. The principal point is the point where the principal optical axis crosses the image plane. The values $f_x$ and $f_y$ are the focal length values in x and y axes.

Also, in some implementations, the extrinsic camera parameter can be more complex than described above. In a more realistic case, for example, R may define a rotation only in the xz plan and can be described as follows:

$$R = \begin{pmatrix} \cos\theta & 0 & -\sin\theta \\ 0 & 1 & 0 \\ \sin\theta & 0 & \cos\theta \end{pmatrix} \quad (7)$$

In stereoscopic video, cameras may have the same intrinsic parameters. This may be the case, for example, when there is only a translation between two cameras and one of the cameras is aligned with the world coordinate system. In this case, R=I, T=0, and $u_1=fx_w/z_w$, $v_1=fy_w/z_w$. If the second camera is located in parallel with the first camera, then R=I, T=(d 0 0)$^T$. In this case, the following may be derived:

$$u_2 = f(x_w + d)/z_w = u_1 + fd/z_w \quad (8).$$

The $fd/z_w$ is also called disparity. 3D warping, in this case, may simply require a calculation of disparity, although the previously mentioned problems may still exist.

As the value of each pixel in each color component is stored quantized and represented for 8-bit, depth values may need to be presented with a limited dynamic range. Depth values, for example, may be between 0 and 255 exclusive in an 8-bit dynamic range implementation. Depth values can vary from a large range. However, typically the nearest depth and the farthest depth values are mapped to 0 and 255, respectively, and any other depth value should be mapped to a value outside the range of 0 to 255.

Some typical depth value qualification methods are listed as follows.

$$\left(1 - \frac{v}{255}\right)(z_{far} - z_{near}) = z - z_{near} \quad (9)$$

or $$\frac{1}{z} - \frac{1}{z_{far}} = \frac{v}{255}\left(\frac{1}{z_{near}} - \frac{1}{z_{far}}\right) \quad (10)$$

In the two equations above, v is the value quantized to [0, 255] and z is a depth value, which also may be stored in one byte. The value z may be normalized to [0, 255]. Normally, a pixel that is closer to the camera defines a larger value, while the pixel with larger depth is converted to a smaller value of [0, 255]. Accordingly, it may be desirable to linearly convert a depth value from [$z_{near}$, $z_{far}$] to [0, 255], with $z_{near}$ mapped to 255 and, $z_{far}$ mapped to 0. This is the concept of equation (9) shown above. Another way to achieve the conversion is to linearly convert an inverse value of depth from [$1/z_{far}$, $1/z_{near}$] to [0, 255], with $1/z_{near}$ mapped to 255 and $1/z_{far}$ mapped to 0. This other way is the concept of equation (10) shown above.

2D video communication systems based on H.264/AVC have been widely deployed, without considering any 3D support. For most of the 2D content delivered in such a system, several problems may occur if 3D video is desired. In particular, the video content may not have a 3D video source, which typically is captured by a multiple camera system or even converted from 3D model. For video content that is not from a 3D video source, there may lack signaling of whether such video content can be used for 3D display after some processing at the decoder.

If 3D display is possible for a 2D content coded in H.264/AVC, when generating an extra view from the existing view, some side information, e.g., camera parameters, the depth range of the scene, or other parameters, can be helpful. However, there may need to be a mechanism to communicate such information in the current H.264/AVC bitstream. For this, the techniques of this disclosure may use the SEI messages of H.264/AVC or similar types of messages.

Another issue or problem is that typically, when an extra view is generated, there is a region in the generated view that should not be visible because the horizontal displacement of the two assumed cameras for the transmitted view and the generated view. When this undesirable region introduces noticeable artifact, it may be undesirable to show this region in generated view. To address this concern, the techniques of this disclosure provide for the ability to define a crop region and signal this in the bitstream.

In some aspects, the techniques of this disclosure enable a coded video stream, e.g., an H.264/AVC bitstream containing a 2D sequence of video frames to be converted and displayed in a 3D fashion, e.g., according to stereo display. Signaling mechanisms are used in accordance with this disclosure to indicate the information needed for 2D to 3D conversion. In this case, the decoder may generate another video sequence (e.g., a second view) which together with the original decoded video sequence, enables 3D display.

In the techniques of this disclosure, 2D to 3D conversion information is provided in a bitstream. The encoded video information in the bitstream is generally a 2D representation of the scene, which does not contain extra views or depth maps. Accordingly, the bandwidth of the coded 2D content is very similar to the bandwidth of a corresponding 2D sequence that does not contain any SEI messages related to 2D to 3D conversion. In some cases, the 2D video sequence is pre-stored at the encoding device, and is not captured or encoded at the encoding device. In this case, the 2D to 3D conversion information may contain camera parameters that are input and defined based on default settings. In other cases, the 2D video content may be captured but not encoded. In this case, the encoder may encode the 2D content without any 3D content as input. An encoder with knowledge of 2D to 3D conversion, however, may generate necessary information for 3D conversion, and may include this information in SEI messages of an H.264/AVC bitstream. In still other cases, the encoding device may capture and encode 2D video content. In this case, the encoding device may add the 2D to 3D conversion information, possibly by analyzing (e.g., during a decoding process) the 2D video bitstream.

When the video content is decoded by an H.264/AVC decoder without supporting 2D to 3D conversion, 2D video may be reconstructed and displayed. However, if the decoder supports the 2D to 3D conversion information, and thus has 2D to 3D conversion functionality, the decoder may generate the frames associated with a secondary view based on the decoded 2D video sequence and the associated 2D to 3D conversion information. The two views (decoded and generated views) can then be shown in a 3D display.

According to this disclosure, the 3D conversion information comprises a set of parameters that can be applied to each of the video frames of the 2D sequence to generate 3D video data. As mentioned, the SEI messages of ITU H.264/AVC may be one mechanism for communicating this 3D conversion information in the bitstream, although other messages or mechanisms may be used, particularly with other standards. The 3D conversion information may include some or all of the following:

1—An indication that the associated coded video sequence can be converted to 3D.
2—Important camera parameters, e.g., the focal length of the cameras, and/or the translation of the assumed camera corresponding to the virtual view.
3—A depth range of the current scene.
4—Regions in the decoded video (original view) and the virtual view that may need special treatment or cropping.

TABLE 1, below, provides one example of 3D conversion information (2D to 3D conversion information) in the form of SEI message syntax including various SEI message syntax elements.

TABLE 1

| 2D_to_3D_conversion_info( payloadSize ) { | C | Descriptor |
|---|---|---|
| camera_scene_para_present_flag | 5 | u(1) |
| left_view_original_flag | 5 | u(1) |
| dummy_region_flag | 5 | u(1) |
| if ( camera_scene_para_present_flag ) { | | |
|   focal_length | 5 | ue(v) |
|   near_depth | 5 | ue(v) |
|   far_depth | 5 | ue(v) |
|   translate_x | 5 | ue(v) |
| } | | |
| if ( dummy_region_flag ) { | | |
|   dum_reg_width | 5 | ue(v) |
| } | | |
| } | | |

The variables u(1) and ue(v) may be those defined in the H.264/AVC specification, wherein u(1) is the category of coding a flag in a bitstream and ue(v) is the category of coding an unsigned integer in a bitstream using Exponential Golomb (variable length) coding.

The exemplary 3D conversion information of Table 1 may have semantics as explained below. When present, this SEI message may apply to target access units that include a current access unit and all the subsequent access units, in decoding order, until the next 2D to 3D conversion SEI message occurs, or the end of the coded video sequence occurs. The first 2D to 3D conversion SEI message, when present, may appear in the first access unit of the coded video sequence. This SEI message, when present, may indicate that another view can be generated, based on the decoded video. The decoded video can be defined as the original view, and the secondary view that is generated by the decoder can be denoted as a generated view. Two cameras can be assumed for the original view and the generated view.

The variable camera_scene_para_present_flag of Table 1, when set to a value of 1, may indicate that the focal length, the depth range values and the translate of the two cameras are specified in the SEI message. If camera_scene_para_present_flag equals 0, this may indicate that the focal_length, the near_dapth, the far_dapth and translate_x can be inferred by some default values. As an example, the default values of focal_length, near_depth, far_depth and translate_x may be defined as 1000, 2000, 4000 and PicWidthInSamples$_L$/16 respectively. If camera_scene_para_present_flag equals 1, then the focal length, the depth range values and the translate value are explicitly included in the bitstream, but if camera_scene_para_present_flag equals zero, then these values are not explicitly included in the bitstream.

The variable left_view_original_flag of Table 1 may equal 1 to indicate that the generated view is in the left of the original view, meaning that the assumed camera for the generated view is left of the original camera of the original view. If the variable left_view_original_flag equal to 0 indicates that the generated view is in the right of the original view. Of course, these right and left designations could be reversed.

The variable dummy_region_flag of Table 1 may equal 1 to indicate that there is a dummy region for the two views and this region is cropped before display. The variable focal_length of Table 1 may specify the focal length of the cameras. As an example, the value of focal_length may be in a range of 1 to $2^{32}-1$, inclusive. The variable near_depth of Table 1 specifies the least depth value of the pixels in the original and generated views. The variable near_depth may be in a range of 1 to far_depth−1, inclusive. The variable far_depth of Table 1 specifies the largest depth value of the pixels in the original and generated views. The value of far_depth may be in the range of near_depth+1 to $2^{32}-1$, inclusive.

The variable translate_x of Table 1 specifies the distance between the assumed cameras of the original view and the generated view. The variable dum_reg_width specifies the width of the region that are not used for output and are cropped for the original and generated views, in the units of luma samples. The dum_reg_width may only be included when the dummy_region_flag is equal to 1.

When left_view_original_flag is equal to 1, the output region is cropped to a region from 0 to PicWidthInSamples$_L$−dum_reg_width−1, inclusive in the horizontal direction. When left_view_original_flag is equal to 0, the output region is cropped to a region from dum_reg_width to PicWidthInSamples$_L$−1, inclusively. The value of dum_reg_width may be inferred to as PicWidthInSamples$_L$/16.

The 3D conversion information, e.g., in the SEI message, does not necessarily specify the algorithm to apply for view synthesis at the decoder in order to generate the extra view. However, in the 3D warping based algorithm, equation (8) above could be used for the 3D warping, which actually maps one pixel in the original view to the virtual view. In this case, $z_w$ is the depth of a pixel in the original view and it is within the interval of [near_depth, far_depth], and f is the focal_length and the absolute value of d is translate_x.

Alternatively, the focal_length, the near_depth, the far_depth and the translate_x could be signaled as signed double values, according to the IEC 60559 specification or another communication protocol. In IEC 60559, a value X is signaled for three parts, the sign s(+/−), the N (mantissa part) and the E (exponent part). One possible implementation of calculating the value X is described in the following pseudo-code.

If $0<E<63$, then $X=(-1)^s \cdot 2^{E-31} \cdot (1 \cdot M)$

If $E=0$ and $M$ is non-zero, then $X=(-1)^s \cdot 2^{-30} \cdot (0 \cdot M)$

If $E=0$ and $M=0$, then $X=(-1)^s \cdot 0$, where X is the variable to be calculated, s, N and E correspond to the associated sign, exponent and mantissa syntax elements for each variable to be calculated, and M=bin2float(N) with 0<=M<1. The association between each camera parameter variable and corresponding syntax elements is subject to a wide variety of implementations.

Also, in addition to the parameters above, an additional parameters may be used. For example, a convergence-depth value that quantifies an assumed distance of the convergence image plane to two different cameras may be included in the set of parameters. With the parameters of table 1, the convergence-depth value may be assumed to be infinite, but in other cases, the convergence-depth value may be specifically included in the set of parameters.

The following psuedo-code provides an example of the bin2float( ) function that converts a binary representation of a fractional number into a corresponding floating-point number. The psuedo-code of a function M=bin2float(N) may be given as follows:

```
float M = 0;
float factor = 2^(−v); /* v is the length of the mantissa */
for ( i = 0; i < v; i++) {
    M = M + factor * (N >> i) & 0x01;
    factor = factor * 2;
}
```

Alternatively, more camera parameters can be signaled. For example, the intrinsic parameters including different focal lengths for x and y axis, $f_x$ and $f_y$, and skew factor, or even the principal point, as shown in Equation (6) could be also signaled. In addition, the assumed camera for the generated view may have a rotation in the xz plane, so this value, the θ as shown in Equation (7), could also be signaled.

Figure 7:
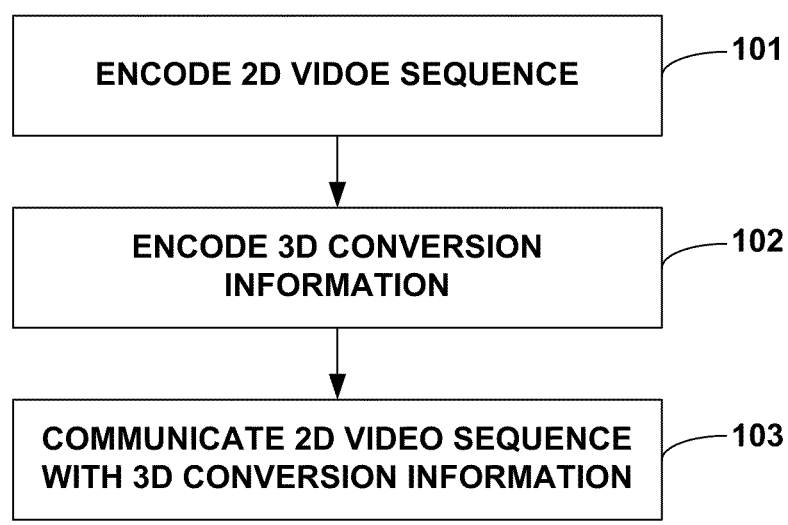
FIG. 7 is a flow chart illustrating an exemplary process performed by a video encoding device consistent with this disclosure.

FIG. 7 is a flow diagram illustrating an encoding process that may be performed by a device that includes video encoder 50 consistent with this disclosure. As shown, in FIG. 7, video encoder 50 encodes a 2D sequence of video frames (101), and 2D to 3D conversion unit 36 encodes 3D conversion information via the video encoder, wherein the 3D conversion information comprises a set of parameters that can be applied to each of the video frames of the 2D sequence to generate 3D video data (102). The device that includes video encoder 50 can then communicate the encoded 2D sequence with the 3D conversion information (103). Referring to FIG. 1, for example, video encoder 22 may correspond to video encoder 50. In this case, source device 12 may communicate the encoded 2D sequence with the 3D conversion information (103) via modem 23 and transmitter 24, which modulate and transmit the information according to a wireless protocol, such as code division multi access (CDMA).

In encoding the 2D sequence, video encoder 50 may encode the 2D sequence according to an ITU H.264 video encoding standard. In this case, encoding the 3D conversion information may comprise encoding the 3D conversion information into one or more SEI messages supported by the ITU H.264 video encoding standard, as explained above. The 2D sequence may be referred to as a first 2D sequence (e.g., an original sequence). The set of parameters can be applied to each of the video frames of the first 2D sequence (the original sequence) to generate a second 2D sequence of video frames (e.g., a secondary view), wherein the first and second 2D sequences collectively define a 3D stereoscopic video sequence.

The 3D conversion information may include information identifying a 3D conversion process to be applied on the 2D sequence to generate the 3D video data. As explained above, the 3D conversion information may include camera parameters and values associated with capturing the 2D sequence. For example, the 3D conversion information may include a focal length value indicative of a focal length associated with a camera that captured the 2D sequence, a near-depth value that specifies a minimum depth in the 3D video data, a far-depth value that specifies a maximum depth in the 3D video data, and a translate value that quantifies an assumed distance between two cameras associated with the 3D video data.

The 3D conversion information may include a flag that indicates whether explicit set of 3D parameters are included in 3D conversion information or whether a default set of 3D parameters should be used. In addition, the 3D conversion information may include a flag that indicates whether a second view of the 2D sequence should be generated left or right of the 2D sequence. Also, the 3D conversion information may include a flag that identifies a crop region that should be removed from the 3D video data.

In one example, a first flag may indicate whether an explicit set of 3D parameters are included in the 3D conversion information or whether a default set of 3D parameters should be used, wherein the explicit set of 3D parameters are included in the 3D conversion information when the first flag is set. A second flag that may indicate whether a second view of the 2D sequence should be generated left or right of the 2D sequence, and a third flag may identify whether a crop region that should be removed from the 3D video data, wherein information defining the crop region is included in the 3D conversion information when the third flag is set.

Figure 8:
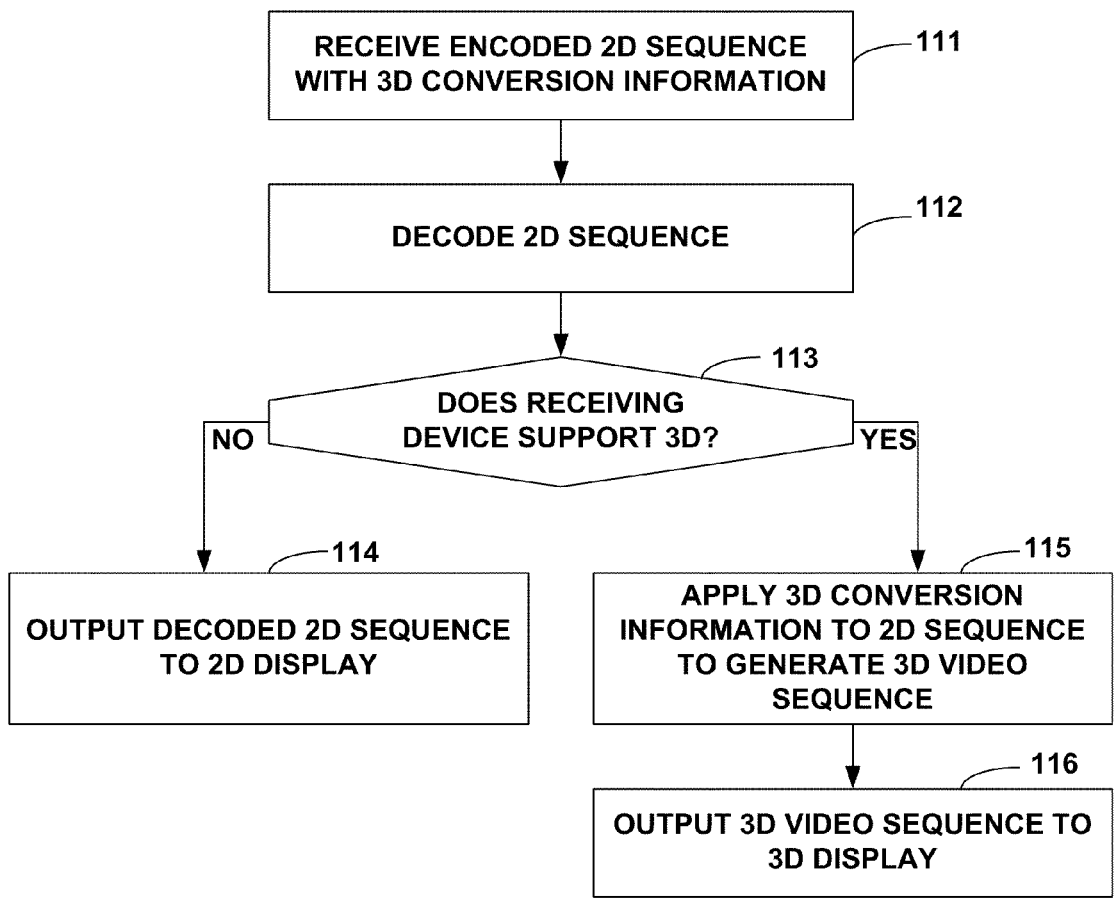
FIG. 8 is a flow chart illustrating an exemplary process performed by a video decoding device consistent with this disclosure.

FIG. 8 is a flow diagram illustrating a decoding process consistent with this disclosure. Video decoder 70 receives an encoded 2D sequence with 3D conversion information (101), and decodes the 2D sequence (102). For example, entropy decoding unit 72 may perform entropy decoding of the bitstream to generate quantized coefficients for residual video blocks of a 2D sequence. Entropy coding unit 72 may parse syntax elements from the bitstream and forward such syntax elements to various units of video decoder 70. Entropy coding unit 72 may parse SEI messages to identify any syntax in such messages. Motion information (e.g., motion vectors) and other syntax information, for example, may be forwarded to prediction unit 75. Prediction unit 75 uses the motion information or other syntax elements to identify a prediction block that was used in the encoding. For inter-based decoding, the motion vector may be applied in a motion compensation process to generate the prediction block from one or more lists of prediction data. For inter-based decoding, the syntax may comprise an intra mode, which may define how the prediction block should be generated based on data from the same frame as that of the video block being decoded.

Inverse quantization unit 76 inverse quantizes data from entropy decoding unit 72, and inverse transform unit performs an inverse transform to generate the residual block in the pixel domain. Adder 79 then combines the residual block with the prediction block generated by prediction unit 75 to generate a reconstruction of the original video block, which may be stored in memory 74 and/or output to a display as decoded 2D video data. Many video blocks may be decoded in this way to reconstruct video frames and ultimately reconstruct an entire 2D sequence of video frames in memory 74.

Video decoder 70 may determine whether it supports 3D video (103). In other words, video decoder 70 may determine whether it includes a 2D to 3D conversion unit 79. This may be explicitly determined, or alternatively, video decoder 70 may inherently operate according to 2D decoding if video decoder 70 does not include a 2D to 3D conversion unit 79. If video decoder 70 includes a 2D to 3D conversion unit 79, 3D video may be generated.

Thus, if video decoder 70 does not support 3D video (no branch of 113), video decoder 114 may output the decoded 2D sequence to a 2D display. On the other hand, if video decoder 70 supports 3D video (yes branch of 113), 2D to 3D conversion unit 79 applies the 3D conversion information to the decoded 2D sequence to generate a 3D video sequence (115), which can then be output from video decoder 70 to a 3D display (116). In this way, the 2D sequence communicated with 3D conversion information may support 3D video for decoding devices that support 2D to 3D conversion, but may also support conventional 2D video for legacy devices that only support 2D video.

In still other examples, it may not be necessary to communicate the 3D conversion information with the 2D sequence. For example, an encoder or a decoder may simply apply the 3D conversion information described herein to a 2D sequence that is stored or received in order to generate 3D video data. Accordingly, this disclosure contemplates methods, computer-readable storage media, apparatuses and devices that apply 3D conversion information to a 2D sequence to generate 3D video data, wherein the 3D conversion information comprises a set of parameters that can be applied to each video frame of the 2D sequence to generate the 3D video data.

The techniques of this disclosure may be implemented in a wide variety of devices or apparatuses, including a wireless communication device handset such as a mobile phone, an integrated circuit (IC) or a set of ICs (i.e., a chip set). Any components, modules or units have been described provided to emphasize functional aspects and does not necessarily require realization by different hardware units. The techniques described herein may also be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset.

If implemented in software, the techniques may be realized at least in part by a computer-readable medium comprising instructions that, when executed in a processor, performs one or more of the methods described above. The computer-readable medium may comprise a computer-readable storage medium and may form part of a computer program product, which may include packaging materials. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code or instructions may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video codec. Also, the techniques could be fully implemented in one or more circuits or logic elements.

The disclosure also contemplates any of a variety of integrated circuit devices that include circuitry to implement one or more of the techniques described in this disclosure. Such circuitry may be provided in a single integrated circuit chip or in multiple, interoperable integrated circuit chips in a so-called chipset. Such integrated circuit devices may be used in a variety of applications, some of which may include use in wireless communication devices, such as mobile telephone handsets.

Various examples have been described in this disclosure. These and other examples are within the scope of the following claims.

The invention claimed is:

1. A method comprising:
    encoding a first two-dimensional (2D) sequence of video frames in a video encoder;
    encoding three-dimensional (3D) conversion information via the video encoder, wherein the 3D conversion information is derived from the first 2D sequence, such that the 3D conversion information comprises a set of parameters that can be applied to each of the video frames of the first 2D sequence to generate a second 2D sequence that, together with the first 2D sequence, define a stereoscopic video sequence of 3D video data, whereby the stereoscopic video sequence of 3D video data is derivable from the 3D conversion information and the first 2D sequence, and wherein the 3D conversion information includes a flag that identifies whether a crop region should be removed from the 3D video data, and wherein information defining the crop region is included in the 3D conversion information when the flag is set; and
    communicating the encoded first 2D sequence with the 3D conversion information.

2. The method of claim 1, wherein encoding the first 2D sequence comprises encoding the first 2D sequence according to an ITU H.264 video encoding standard, and wherein encoding the 3D conversion information comprises encoding the 3D conversion information into one or more supplemental enhancement information (SEI) messages supported by the ITU H.264 video encoding standard.

3. The method of claim 1, wherein the 3D conversion information includes information identifying a 3D conversion process to be applied on the first 2D sequence to generate the 3D video data.

4. The method of claim 1, wherein the 3D conversion information includes camera parameters and values associated with capturing the first 2D sequence.

5. The method of claim 1, wherein the 3D conversion information includes:
    a focal length value indicative of a focal length associated with a camera that captured the first 2D sequence, a near-depth value that specifies a minimum depth in the 3D video data, a far-depth value that specifies a maximum depth in the 3D video data, and a translate value that quantifies an assumed distance between two cameras associated with the 3D video data.

6. The method of claim 1, wherein the 3D conversion information includes:

a focal length value indicative of a focal length associated with a camera that captured the first 2D sequence, a near-depth value that specifies a minimum depth in the 3D video data, a far-depth value that specifies a maximum depth in the 3D video data, a translate value that quantifies an assumed distance between two cameras associated with the 3D video data, and a convergence-depth value that quantifies an assumed distance of the convergence image plane to the two cameras.

7. The method of claim 1, wherein the 3D conversion information includes a flag that indicates whether explicit set of 3D parameters are included in 3D conversion information or whether a default set of 3D parameters should be used.

8. The method of claim 1, wherein the 3D conversion information includes a flag that indicates whether a second view of the first 2D sequence should be generated left or right of the first 2D sequence.

9. The method of claim 1, wherein the 3D conversion information includes:

a first flag that indicates whether an explicit set of 3D parameters are included in the 3D conversion information or whether a default set of 3D parameters should be used, wherein the explicit set of 3D parameters are included in the 3D conversion information when the first flag is set, and a second flag that indicates whether a second view of the first 2D sequence should be generated left or right of the first 2D sequence.

10. A method comprising:

receiving a first two-dimensional (2D) sequence of video frames at a video decoder;

receiving three-dimensional (3D) conversion information with the first 2D sequence at the video decoder, wherein the 3D conversion information is derived from the first 2D sequence, such that the 3D conversion information comprises a set of parameters that can be applied to each of the video frames of the first 2D sequence to generate a second 2D sequence that, together with the first 2D sequence, define a stereoscopic video sequence of 3D video data, and wherein the 3D conversion information includes a flag that identifies whether a crop region should be removed from the 3D video data, and wherein information defining the crop region is included in the 3D conversion information when the flag is set;

decoding the first 2D sequence via the video decoder; and generating the 3D video data via the video decoder based on the first 2D sequence and the 3D conversion information.

11. The method of claim 10, wherein the first 2D sequence is encoded according to an ITU H.264 video encoding standard, and wherein the 3D conversion information is received in one or more supplemental enhancement information (SEI) messages supported by the ITU H.264 video encoding standard.

12. The method of claim 10, wherein the 3D conversion information includes information identifying a 3D conversion process to be applied on the first 2D sequence to generate the 3D video data.

13. The method of claim 10, wherein the 3D conversion information includes camera parameters and values associated with capturing the first 2D sequence.

14. The method of claim 10, wherein the 3D conversion information includes:

a focal length value indicative of a focal length associated with a camera that captured the first 2D sequence, a near-depth value that specifies a minimum depth in the 3D video data, a far-depth value that specifies a maximum depth in the 3D video data, and a translate value that quantifies an assumed distance between two cameras associated with the 3D video data.

15. The method of claim 10, wherein the 3D conversion information includes:

a focal length value indicative of a focal length associated with a camera that captured the first 2D sequence, a near-depth value that specifies a minimum depth in the 3D video data, a far-depth value that specifies a maximum depth in the 3D video data, a translate value that quantifies an assumed distance between two cameras associated with the 3D video data, and a convergence-depth value that quantifies an assumed distance of the convergence image plane to the two cameras.

16. The method of claim 10, wherein the 3D conversion information includes a flag that indicates whether explicit set of 3D parameters are included in 3D conversion information or whether a default set of 3D parameters should be used.

17. The method of claim 10, wherein the 3D conversion information includes a flag that indicates whether a second view of the first 2D sequence should be generated left or right of the first 2D sequence.

18. The method of claim 10, wherein the 3D conversion information includes:

a first flag that indicates whether an explicit set of 3D parameters are included in the 3D conversion information or whether a default set of 3D parameters should be used, wherein the explicit set of 3D parameters are included in the 3D conversion information when the first flag is set, and a second flag that indicates whether a second view of the first 2D sequence should be generated left or right of the first 2D sequence.

19. The method of claim 10, further comprising:

determining whether a receiving device can generate and render the 3D video data;

generating and rendering the 3D video data based on the first 2D sequence and the 3D conversion information when the receiving device can generate and render the 3D video data; and rendering the first 2D sequence when the receiving device cannot generate or render the 3D video data.

20. An apparatus comprising:

a video encoder that encodes a first two-dimensional (2D) sequence of video frames, and encodes three-dimensional (3D) conversion information with the first 2D sequence, wherein the 3D conversion information is derived from the first 2D sequence, such that the 3D conversion information comprises a set of parameters that can be applied to each of the video frames of the first 2D sequence to generate a second 2D sequence, that together with the first 2D sequence, define a stereoscopic video sequence of 3D video data, whereby the stereoscopic video sequence of 3D video data is derivable from the 3D conversion information and the first 2D sequence, and wherein the 3D conversion information includes a flag that identifies whether a crop region should be removed from the 3D video data, and wherein information defining the crop region is included in the 3D conversion information when the flag is set.

21. The apparatus of claim 20, further comprising a transmitter that communicates the encoded first 2D sequence with the 3D conversion information to another device.

22. The apparatus of claim 20, wherein the video encoder encodes the first 2D sequence according to an ITU H.264 video encoding standard and encodes the 3D conversion information into one or more supplemental enhancement information (SEI) messages supported by the ITU H.264 video encoding standard.

23. The apparatus of claim 20, wherein the 3D conversion information includes information identifying a 3D conversion process to be applied on the first 2D sequence to generate the 3D video data.

24. The apparatus of claim 20, wherein the 3D conversion information includes camera parameters and values associated with capturing the first 2D sequence.

25. The apparatus of claim 20, wherein the 3D conversion information includes:
  a focal length value indicative of a focal length associated with a camera that captured the first 2D sequence,
  a near-depth value that specifies a minimum depth in the 3D video data,
  a far-depth value that specifies a maximum depth in the 3D video data, and
  a translate value that quantifies an assumed distance between two cameras associated with the 3D video data.

26. The apparatus of claim 20, wherein the 3D conversion information includes:
  a focal length value indicative of a focal length associated with a camera that captured the first 2D sequence,
  a near-depth value that specifies a minimum depth in the 3D video data,
  a far-depth value that specifies a maximum depth in the 3D video data,
  a translate value that quantifies an assumed distance between two cameras associated with the 3D video data, and
  a convergence-depth value that quantifies an assumed distance of the convergence image plane to the two cameras.

27. The apparatus of claim 20, wherein the 3D conversion information includes a flag that indicates whether explicit set of 3D parameters are included in 3D conversion information or whether a default set of 3D parameters should be used.

28. The apparatus of claim 20, wherein the 3D conversion information includes a flag that indicates whether a second view of the first 2D sequence should be generated left or right of the first 2D sequence.

29. The apparatus of claim 20, wherein the 3D conversion information includes:
  a first flag that indicates whether an explicit set of 3D parameters are included in the 3D conversion information or whether a default set of 3D parameters should be used, wherein the explicit set of 3D parameters are included in the 3D conversion information when the first flag is set, and
  a second flag that indicates whether a second view of the first 2D sequence should be generated left or right of the first 2D sequence.

30. The apparatus of claim 20, wherein the apparatus comprises at least one of:
  an integrated circuit;
  a microprocessor, and
  a wireless communication device that includes the video encoder.

31. An apparatus comprising:
  a video decoder that receives a first two-dimensional (2D) sequence of video frames, receives three-dimensional (3D) conversion information with the first 2D sequence, wherein the 3D conversion information is derived from the first 2D sequence, such that the 3D conversion information comprises a set of parameters that can be applied to each of the video frames of the first 2D sequence to generate a second 2D sequence that, together with the first 2D sequence, define a stereoscopic video sequence of 3D video data, decodes the first 2D sequence, and generates the 3D video data based on the first 2D sequence and the 3D conversion information, wherein the 3D conversion information includes a flag that identifies whether a crop region should be removed from the 3D video data, and wherein information defining the crop region is included in the 3D conversion information when the flag is set.

32. The apparatus of claim 31, wherein the first 2D sequence is encoded according to an ITU H.264 video encoding standard, and wherein the 3D conversion information is received in one or more supplemental enhancement information (SEI) messages supported by the ITU H.264 video encoding standard.

33. The apparatus of claim 31, wherein the 3D conversion information includes information identifying a 3D conversion process to be applied on the first 2D sequence to generate the 3D video data.

34. The apparatus of claim 31, wherein the 3D conversion information includes camera parameters and values associated with capturing the first 2D sequence.

35. The apparatus of claim 31, wherein the 3D conversion information includes:
  a focal length value indicative of a focal length associated with a camera that captured the first 2D sequence,
  a near-depth value that specifies a minimum depth in the 3D video data,
  a far-depth value that specifies a maximum depth in the 3D video data, and
  a translate value that quantifies an assumed distance between two cameras associated with the 3D video data.

36. The apparatus of claim 31, wherein the 3D conversion information includes:
  a focal length value indicative of a focal length associated with a camera that captured the first 2D sequence,
  a near-depth value that specifies a minimum depth in the 3D video data,
  a far-depth value that specifies a maximum depth in the 3D video data,
  a translate value that quantifies an assumed distance between two cameras associated with the 3D video data, and
  a convergence-depth value that quantifies an assumed distance of the convergence image plane to the two cameras.

37. The apparatus of claim 31, wherein the 3D conversion information includes a flag that indicates whether explicit set of 3D parameters are included in 3D conversion information or whether a default set of 3D parameters should be used.

38. The apparatus of claim 31, wherein the 3D conversion information includes a flag that indicates whether a second view of the first 2D sequence should be generated left or right of the first 2D sequence.

39. The apparatus of claim 31, wherein the 3D conversion information includes:
a first flag that indicates whether an explicit set of 3D parameters are included in the 3D conversion information or whether a default set of 3D parameters should be used, wherein the explicit set of 3D parameters are included in the 3D conversion information when the first flag is set, and
a second flag that indicates whether a second view of the first 2D sequence should be generated left or right of the first 2D sequence.

40. The apparatus of claim 31, wherein the apparatus includes a display and wherein the apparatus:
determines whether the apparatus can generate and render the 3D video data;
generates and renders the 3D video data on the display based on the first 2D sequence and the 3D conversion information when the apparatus can generate and render the 3D video data; and
renders the first 2D sequence on the display when the apparatus cannot generate or render the 3D video data.

41. The apparatus of claim 31, wherein the apparatus comprises at least one of:
an integrated circuit;
a microprocessor, and
a wireless communication device that includes the video decoder.

42. A device comprising:
means for encoding a first two-dimensional (2D) sequence of video frames in a video encoder;
means for encoding three-dimensional (3D) conversion information via the video encoder, wherein the 3D conversion information is derived from the first 2D sequence, such that the 3D conversion information comprises a set of parameters that can be applied to each of the video frames of the first 2D sequence to generate a second 2D sequence that, together with the first 2D sequence, define a stereoscopic video sequence of 3D video data, whereby the stereoscopic video sequence of 3D video data is derivable from the 3D conversion information and the first 2D sequence, and wherein the 3D conversion information includes a flag that identifies whether a crop region should be removed from the 3D video data, and wherein information defining the crop region is included in the 3D conversion information when the flag is set; and
means for communicating the encoded first 2D sequence with the encoded parameters.

43. A device comprising:
means for receiving a first two-dimensional (2D) sequence of video frames at a video decoder;
means for receiving three-dimensional (3D) conversion information with the first 2D sequence at the video encoder, wherein the 3D conversion information is derived from the first 2D sequence, such that the 3D conversion information comprises a set of parameters that can be applied to each of the video frames of the first 2D sequence to generate a second 2D sequence that, together with the first 2D sequence, define a stereoscopic video sequence of 3D video data, wherein the 3D conversion information includes a flag that identifies whether a crop region should be removed from the 3D video data, and wherein information defining the crop region is included in the 3D conversion information when the flag is set;
means for decoding the first 2D sequence; and
means for generating the 3D video data based on the first 2D sequence and the 3D conversion information.

44. A non-transitory computer-readable storage medium storing instructions that upon execution by a processor cause the processor to:
encode a first two-dimensional (2D) sequence of video frames; and
encode three-dimensional (3D) conversion information, wherein the 3D conversion information is derived from the first 2D sequence, such that the 3D conversion information comprises a set of parameters that can be applied to each of the video frames of the first 2D sequence to generate a second 2D sequence that, together with the first 2D sequence, define a stereoscopic video sequence of 3D video data, whereby the stereoscopic video sequence of 3D video data is derivable from the 3D conversion information and the first 2D sequence, and wherein the 3D conversion information includes a flag that identifies whether a crop region should be removed from the 3D video data, and wherein information defining the crop region is included in the 3D conversion information when the flag is set.

45. A non-transitory computer-readable storage medium storing instructions that upon execution by a processor cause the processor to:
upon receiving a first two-dimensional (2D) sequence of video frames and receiving three-dimensional (3D) conversion information with the first 2D sequence, wherein the 3D conversion information is derived from the first 2D sequence, such that the 3D conversion information comprises a set of parameters that can be applied to each of the video frames of the first 2D sequence to generate a second 2D sequence that, together with the first 2D sequence, define a stereoscopic video sequence of 3D video data, and wherein the 3D conversion information includes a flag that identifies whether a crop region should be removed from the 3D video data, and wherein information defining the crop region is included in the 3D conversion information when the flag is set;
decode the first 2D sequence; and
generate the 3D video data based on the first 2D sequence and the 3D conversion information.

46. A method comprising:
applying 3D conversion information to a first 2D sequence of video frames to generate 3D video data, wherein the 3D conversion information is derived from the first 2D sequence, such that the 3D conversion information comprises a set of parameters that can be applied to each video frame of the first 2D sequence to generate a second 2D sequence that, together with the first 2D sequence, define a stereoscopic video sequence of the 3D video data, whereby the stereoscopic video sequence of 3D video data is derivable from the 3D conversion information and the first 2D sequence, wherein the 3D conversion information includes a flag that identifies whether a crop region should be removed from the 3D video data, and wherein information defining the crop region is included in the 3D conversion information when the flag is set.

* * * * *